(12) United States Patent
Shi et al.

(10) Patent No.: US 11,264,045 B2
(45) Date of Patent: Mar. 1, 2022

(54) ADAPTIVE AUDIO FILTERING

(71) Applicant: Dolby Laboratories Licensing Corporation, San Francisco, CA (US)

(72) Inventors: Dong Shi, Singapore (SG); Glenn N. Dickins, Como (AU); David Gunawan, Sydney (AU); Xuejing Sun, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 344 days.

(21) Appl. No.: 16/564,532

(22) Filed: Sep. 9, 2019

(65) Prior Publication Data
US 2019/0392855 A1 Dec. 26, 2019

Related U.S. Application Data

(63) Continuation of application No. 15/558,181, filed as application No. PCT/US2016/023487 on Mar. 21, 2016, now Pat. No. 10,410,653.
(Continued)

(30) Foreign Application Priority Data

Mar. 27, 2015 (WO) ................. PCT/CN2015/075208
May 27, 2015 (EP) ..................................... 15169483

(51) Int. Cl.
*G10L 21/0232* (2013.01)
*G10L 21/0208* (2013.01)
(Continued)

(52) U.S. Cl.
CPC ...... *G10L 21/0232* (2013.01); *G10L 21/0208* (2013.01); *G10L 21/028* (2013.01);
(Continued)

(58) Field of Classification Search
CPC ............... G10L 21/028; G10L 21/0232; G10L 21/0208; G10L 2021/02082; G10L 2021/02165; G10L 25/21; H04M 9/082
(Continued)

(56) References Cited

U.S. PATENT DOCUMENTS

| 4,956,838 A | 9/1990 | Gilloire |
| 5,526,426 A | 6/1996 | McLaughlin |

(Continued)

FOREIGN PATENT DOCUMENTS

EP 1639799 3/2006

OTHER PUBLICATIONS

Batalheiro P.B. et al., "Filter Bank Design for a Subband Adaptive Filtering Structure with Critical Sampling",IEEE Transactions on Circuits and Systems Part I:Regular Papers IEEE Service Center NY, vol. 51 No. 6, pp. 1194-1202, Jun. 1, 2004.

(Continued)

*Primary Examiner* — Vijay B Chawan

(57) ABSTRACT

In an audio processing system (300), a filtering section (350, 400): receives subband signals (410, 420, 430) corresponding to audio content of a reference signal (301) in respective frequency subbands; receives subband signals (411, 421, 431) corresponding to audio content of a response signal (304) in the respective subbands; and forms filtered inband references (412, 422, 432) by applying respective filters (413, 423, 433) to the subband signals of the reference signal. For a frequency subband: filtered crossband references (424, 425) are formed by multiplying, by scalar factors (426, 427), filtered inband references of other subbands; a composite filtered reference (428) is formed by summing the filtered inband reference of the subband (422) and the filtered crossband references; a residual signal (429) is computed as a difference between the composite filtered (Continued)

reference and the subband signal of the response signal corresponding to the subband; and the scalar factors and the filter applied to the subband signal of the reference signal corresponding to the subband are adjusted based on the residual signal.

20 Claims, 7 Drawing Sheets

Related U.S. Application Data

(60) Provisional application No. 62/162,937, filed on May 18, 2015.

(51) Int. Cl.
  *H04M 9/08* (2006.01)
  *G10L 21/028* (2013.01)
  *G10L 25/21* (2013.01)

(52) U.S. Cl.
  CPC ............ *G10L 25/21* (2013.01); *H04M 9/082* (2013.01); *G10L 2021/02082* (2013.01)

(58) Field of Classification Search
  USPC ..... 704/207, 200.1, 500–504, 233, 211, 266, 704/224
  See application file for complete search history.

(56) References Cited

U.S. PATENT DOCUMENTS

| | | | |
|---|---|---|---|
| 5,663,955 A | 9/1997 | Iyengar | |
| 5,664,011 A * | 9/1997 | Crochiere | H04M 9/082 379/406.08 |
| 5,680,450 A | 10/1997 | Dent | |
| 5,740,256 A | 4/1998 | Castello Da Costa | |
| 5,937,009 A | 8/1999 | Wong | |
| 5,995,620 A | 11/1999 | Wigren | |
| 6,091,813 A | 7/2000 | Harley | |
| 6,122,384 A | 9/2000 | Mauro | |
| 6,125,179 A | 9/2000 | Wu | |
| 6,473,409 B1 | 10/2002 | Malvar | |
| 6,522,747 B1 | 2/2003 | Reilly | |
| 6,744,887 B1 | 6/2004 | Berstein | |
| 6,842,516 B1 * | 1/2005 | Armbruster | H04M 9/082 379/390.02 |
| 7,672,445 B1 | 3/2010 | Zhang | |
| 8,126,161 B2 * | 2/2012 | Togami | H04M 9/082 381/94.3 |
| 8,150,682 B2 | 4/2012 | Nongpiur | |
| 8,160,273 B2 | 4/2012 | Visser | |
| 8,284,949 B2 | 10/2012 | Farhang | |
| 8,340,278 B2 | 12/2012 | Gowreesunker | |
| 8,538,749 B2 | 9/2013 | Visser | |
| 8,635,063 B2 | 1/2014 | Gao | |
| 9,053,697 B2 * | 6/2015 | Park | G10K 11/17857 |
| 9,319,784 B2 * | 4/2016 | Lu | H04R 3/002 |
| 9,443,525 B2 | 9/2016 | Chen | |
| 2003/0065513 A1 | 4/2003 | Kaminuma | |
| 2003/0076950 A1 | 4/2003 | Usman | |
| 2003/0174661 A1 | 9/2003 | Lee | |
| 2004/0064310 A1 | 4/2004 | Banba | |
| 2004/0254686 A1 | 12/2004 | Matsui | |
| 2004/0264686 A1 * | 12/2004 | Enzner | H04M 9/082 379/406.08 |
| 2006/0034447 A1 | 2/2006 | Alves | |
| 2006/0034448 A1 | 2/2006 | Parry | |
| 2007/0121926 A1 | 5/2007 | Le Gall | |
| 2008/0247535 A1 | 10/2008 | Li | |
| 2008/0253553 A1 | 10/2008 | Li | |
| 2011/0016077 A1 | 1/2011 | Vasilache | |
| 2011/0293103 A1 * | 12/2011 | Park | G10K 11/17827 381/57 |
| 2012/0290525 A1 | 11/2012 | Malik | |
| 2013/0044872 A1 | 2/2013 | Eriksson | |
| 2013/0156210 A1 * | 6/2013 | Shaw | G10K 11/16 381/66 |
| 2013/0218558 A1 | 8/2013 | Kumar | |
| 2013/0246075 A1 | 9/2013 | Oshikiri | |
| 2013/0282368 A1 | 10/2013 | Choo | |
| 2013/0332156 A1 | 12/2013 | Tackin | |
| 2014/0357324 A1 | 12/2014 | Ahgren | |
| 2015/0296296 A1 * | 10/2015 | Lu | G10K 11/17854 381/71.11 |
| 2016/0343381 A1 | 11/2016 | Grancharov | |

OTHER PUBLICATIONS

Gilloire A. et al., "Adaptive filtering in subbands with critical sampling: analysis, experiments and application to acoustic echo cancellation", IEEE Transactions on Signal Processing, vol. 40 No. 8, pp. 1862-1875, Aug. 1992.

Guanghua C. et al., "Analysis and application performance simulation of subband adaptive filtering structures", Conference on High Density Microsystem Design and Packaging and Component Failure Analysis 2006. pp. 16,19, Jun. 27-28, 2006.

Kuech F. et al., "Nonlinear acoustic echo cancellation using adaptive orthogonalized power filters", IEEE International Conference on Acoustics, Speech and Signal Processing 2005 Proceedings (ICASSP '05), vol. 3, pages iii/105-iii/108, Mar. 18-23, 2005.

Mahbub U. et al., "A Single-Channel Acoustic Echo Cancellation Scheme Using Gradient-Based Adaptive Filtering", Circuits Syst Signal Process, vol. 33, Issue 5, pp. 1541-1572, May 2014.

Malik S. et al., "State-Space Frequency-Domain Adaptive Filtering for Nonlinear Acoustic Echo Cancellation", IEEE Transactions on Audio, Speech and Language Processing, vol. 20 Issue 7, pp. 2065-2079, Sep. 2012.

Petraglia M.R. et al., "Prototype filter design for subband adaptive filtering structures with critical sampling", IEEE International Symposium on Circuits and Systems 2000, Proceedings ISCAS 2000 Geneva, vol. 1, pp. 1543-1546, May 1, 2000.

\* cited by examiner

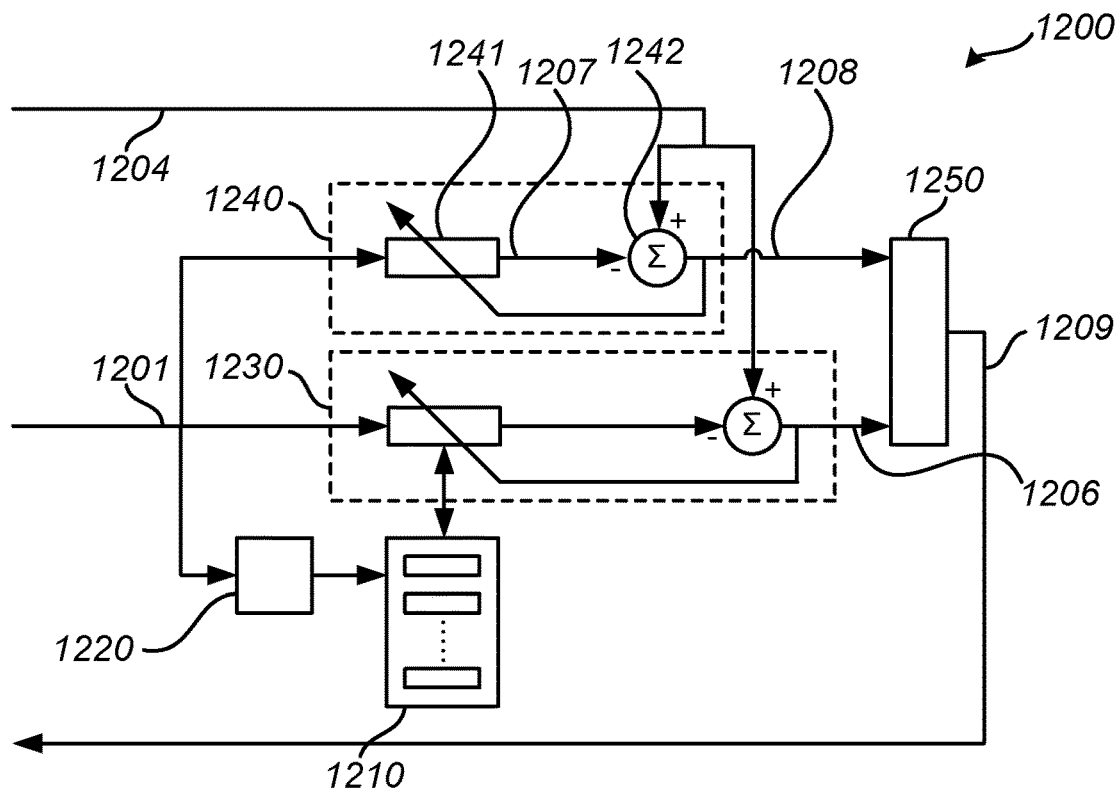
Fig. 12
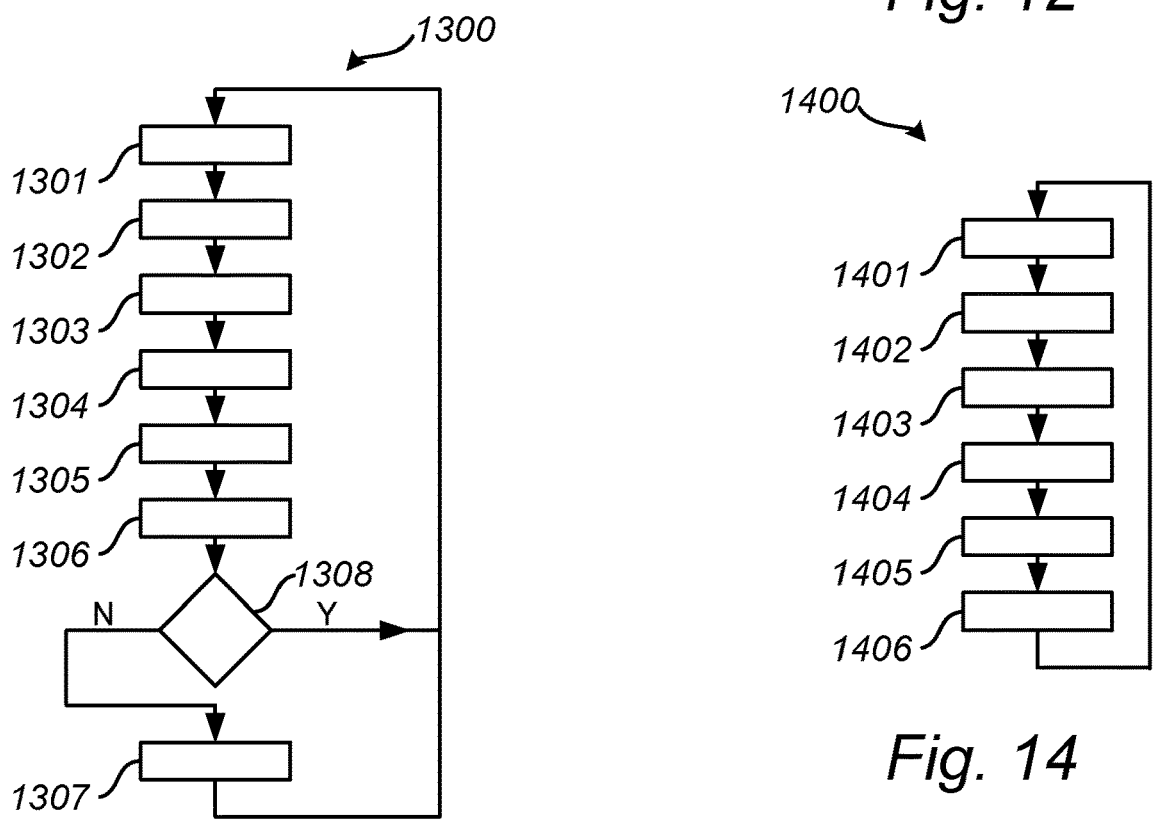
Fig. 13
Fig. 14

ADAPTIVE AUDIO FILTERING

CROSS-REFERENCE TO RELATED APPLICATIONS

This application is continuation of U.S. patent application Ser. No. 15/558,181, filed 13 Sep. 2017; now patent Ser. No. 10/410,653, issued 10 Sep. 2019; which claims the benefit of International Patent Application No. PCT/US2016/023487 filed on 21 Mar. 2016; which claims the benefit of priority to International Patent Application No. PCT/CN2015/075208 filed 27 Mar. 2015; U.S. Provisional Application No. 62/162,937 filed 18 May 2015; and European Patent Application No. 15169483.3 filed 27 May 2015, each hereby incorporated by reference in its entirety.

TECHNICAL FIELD

The invention disclosed herein generally relates to audio processing and in particular to adaptive filtering of audio signals.

BACKGROUND

During a telephone call, speech from a remote user may be provided to a local user via a loudspeaker, and speech from the local user may be picked up by a microphone and transmitted to the remote user. In some cases, such as in teleconferencing applications, the loudspeaker may be located relatively close to the microphone and the audio signal picked up by the microphone may include audio content originating from the remote user. Such audio content may be perceived by the remote user as echo, and is preferably suppressed or cancelled from the audio signal sent to the remote user.

FIG. 1 shows a setup for reducing this echo via so-called acoustic echo cancellation. Speech from the remote user is played back by a loudspeaker 101 and speech from a local user 102 is picked up by a microphone 103 together with the speech from the remote user played back by the loudspeaker 101. A filter 104 is provided for modeling or approximating the system formed by the loudspeaker 101, the microphone 103 and the acoustic environment in which the loudspeaker 101 and the microphone 103 are arranged (e.g. acoustic properties of a room in which the loudspeaker 101 and the microphone 103 are arranged, including the distance between the loudspeaker 101 and the microphone 103 and distances to walls which may reflect sound). The filter 104 is applied to a reference signal 105 including the speech from the remote user. A residual signal 106 is formed by subtracting the filtered reference signal 107 from a response signal 108 provided by the microphone 103 in response to playback by the loudspeaker 101 of the reference signal 105. The subtraction serves to cancel audio content originating from the remote user in the response signal 108 provided by the microphone 103. The residual signal 106 is transmitted, e.g. after additional processing, to the remote user. When the local user 102 is silent, the residual signal 106 is indicative of the modeling error of the filter 104. Hence, when the local user 102 is silent, the filter 104 is adjusted based on the residual signal 106 so as minimize energy or power of the residual signal 106, and thereby to improve the acoustic echo cancellation.

The adaptive filtering provided by the filter 104 may for example be performed by filters in respective frequency subbands. By employing separate filters in the respective subbands, different update step sizes for the filters may for example be employed in the different subbands, depending on the energy of the reference signal 105 in the respective subbands. This may improve the adaption rate of the filter 104.

When employing subband filtering to perform acoustic echo cancellation, downsampling may be employed to reduce computational complexity. This may cause aliasing of audio content from one frequency subband into neighboring subbands. Such aliasing may cause audible echo to persist in the residual signal 106 even if acoustic echo cancellation is performed in each subband. An approach to handle such aliasing is described in the paper "Adaptive Filtering in Subbands with Critical Sampling: Analysis, Experiments, and Application to Acoustic Echo Cancellation" by A. Gilloire and M. Vetterli in IEEE Transactions on Signal Processing, vol. 40, no. 8, August 1992. This approach is illustrated in FIG. 2. For a given subband k, a first filter 201 is applied to the reference signal in that subband k, and second 202 and third 203 filters are applied to the respective neighboring subbands k−1 and k+1 of the reference signal. A residual signal 204 is computed by summing the three filtered subbands signals 205, 206 and 207 and subtracting the sum 208 from a response signal 209 for that frequency subband received from a microphone. The filters 201, 202 and 203 may be adapted to provide acoustic echo cancellation by minimizing the energy or power of the residual signal 204. The second filter 202 and the third filter 203 model aliasing between the given subband k and the neighboring subbands k−1 and k+1 and may improve echo cancellation in at least some applications. Analogous computations may be performed for the other frequency subbands.

Adaptive audio filters similar to those applied for acoustic echo cancellation may be employed also for other purposes. A system providing an output audio signal in response to a reference audio signal may for example be modeled or approximated via such adaptive filters. In other words, filters approximating the impulse response (or transfer function or frequency response) provided by such a system may be provided via such adaptive filtering schemes. For example, adaptive filters may be employed for modeling or approximating the response of a loudspeaker to a speaker feed.

Design of adaptive filtering schemes may for example include considerations relating to the accuracy of the approximation provided by the adaptive filters, the adaption rate of the adaptive filters (i.e. the ability to track changes in the system which is to be modeled or approximated) and/or the computational complexity of the adaptive filtering scheme.

BRIEF DESCRIPTION OF THE DRAWINGS

In what follows, example embodiments will be described with reference to the accompanying drawings, on which:

FIGS. 10-12 are generalized block diagrams of audio processing systems, according to example embodiments;

FIGS. 13-14 are flow charts of audio processing methods, according to example embodiments;

Figure 1:
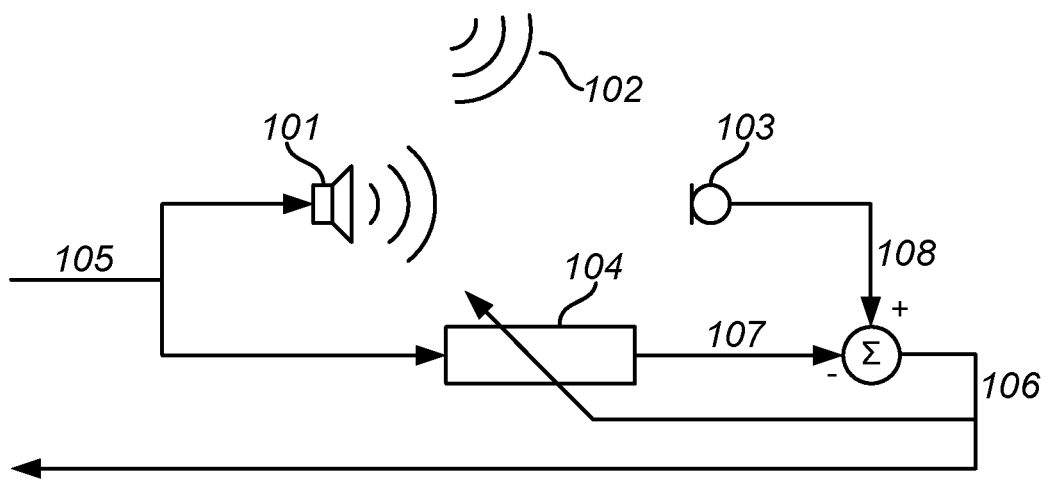
FIG. 1 illustrates an example setup for acoustic echo cancellation.

All the figures are schematic and generally only show parts which are necessary in order to elucidate the invention, whereas other parts may be omitted or merely suggested.

DESCRIPTION OF EXAMPLE EMBODIMENTS

As used herein, an audio signal may be a pure audio signal, an audio part of an audiovisual signal or multimedia signal or any of these in combination with metadata.

I. Overview—Cross Filtering

According to a first aspect, example embodiments propose audio processing methods as well as systems and computer program products. The proposed methods, systems and computer program products, according to the first aspect, may generally share the same features and advantages.

According to example embodiments, there is provided an audio processing method comprising: receiving subband signals corresponding to audio content of a reference signal in respective frequency subbands; receiving subband signals corresponding to audio content of a response signal in the respective frequency subbands; and forming filtered inband references by applying respective filters to the subband signals of the reference signal. The method comprises, for at least one frequency subband: forming one or more filtered crossband references by multiplying, by one or more scalar factors, one or more filtered inband references of one or more other frequency subbands; forming a composite filtered reference by summing the filtered inband reference corresponding to the frequency subband and the one or more filtered crossband references; computing a residual signal as a difference between the composite filtered reference and the subband signal of the response signal corresponding to the frequency subband; and adjusting, based on the residual signal, the one or more scalar factors and the filter applied to the subband signal of the reference signal corresponding to the frequency subband.

Computing the residual signal based on both a filtered inband reference and one or more filtered crossband references (and adjusting, based on the residual signal, the one or more scalar factors and the filter applied to the subband signal of the reference signal corresponding to the frequency subband) allows for compensating for aliasing and/or other spectral leakage between frequency subbands. Aliasing and/or other spectral leakage between frequency subbands may for example be caused by downsampling, insufficient band-isolation when decomposing the reference signal and/or the response signal into subband signals, and/or nonlinearities in a system which provides the response signal in response to the reference signal (and which is to be modeled or approximated via the adaptive filtering). The composite filtered reference, provided via use of the filter and the one or more scalar factors, serves to approximate a subband signal of the reference signal. A power level and/or energy level of the residual signal may be indicative of an error or incompleteness of the approximation provided by the filter and the at least one scalar factor. Compensating for aliasing and/or other spectral leakage between frequency subbands, e.g. by appropriately adjusting the filter and the one or more scalar factors based on the residual signal, allows for reducing an average power or energy of the residual signal.

The inventors have realized that the filtered inband references from other frequency subbands may be employed to compensate for aliasing and/or spectral leakage between the current frequency subband and these other subbands. Modeling such aliasing and/or other spectral leakage by one or more scalar factors multiplied to the respective one or more other filtered inband references (which are already available via filtering in those subbands regardless of any aliasing compensation), instead of using an entire additional filter for each other frequency subband, as described with reference to FIG. 2 (i.e. the second 202 and third 203 filters), reduces the computational complexity of the adaptive filtering. The reduced computational complexity allows for increasing the speed of convergence and the adaption rate of the adaptive filtering.

Figure 2:
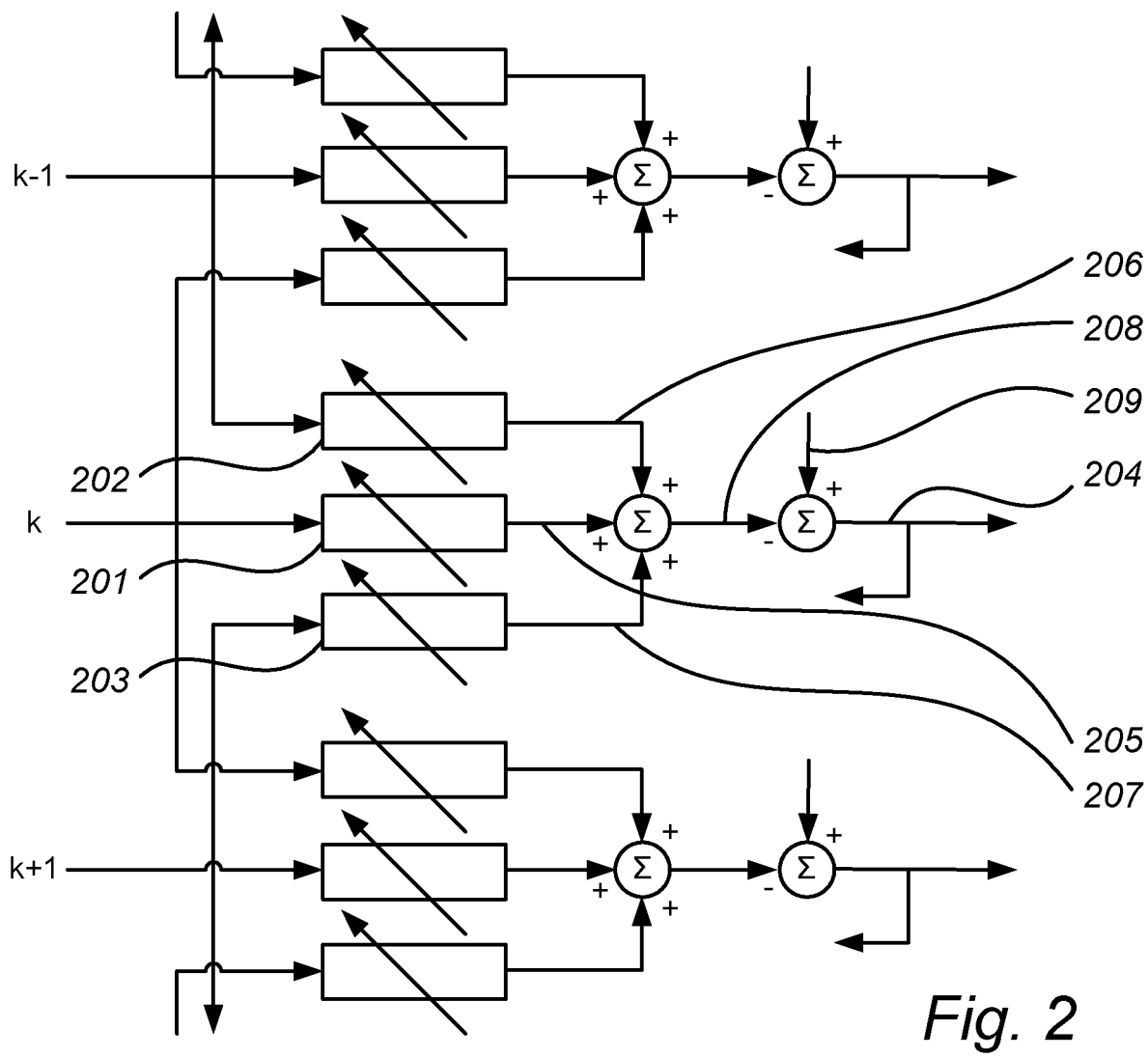
FIG. 2 illustrates an example subband filtering scheme for acoustic echo cancellation.

In other words, in the present example embodiment, aliasing and/or other spectral leakage is compensated for via introduction of one or more additional scalar factors, while in the example described with reference to FIG. 2, aliasing is compensated for via introduction of entire additional filters.

A system providing the response signal in response the reference signal may have time-varying characteristics, such as a time-varying impulse response or transfer function or frequency response (i.e. the system may respond differently to the same reference signal if received at different points in time). The increased adaption rate provided by the use of the one or more scalar factors (instead of additional filters) improves the ability of the adaptive filtering to track such time-varying characteristics.

The reference signal may for example have spectral content in some or all of the frequency subbands, and the subband signals of the reference signal may for example represent the spectral content of the reference signal in the respective frequency subbands. Similarly, the response signal may for example have spectral content in some or all of the frequency subbands, and the subband signals of the response signal may for example represent the spectral content of the response signal in the respective frequency subbands.

The filters applied to the subband signals of the reference signal may for example be multitap filters, e.g. finite impulse response (FIR) filters.

The one or more scalar factors may for example be real numbers which may be positive or negative. If e.g. complex-valued representations (such as complex-valued frequency domain representations) are employed to represent the audio signals, the scalar factors may for example be complex-valued.

Multiplying a filtered inband reference by a scalar factor may for example include multiplying coefficients in a representation (e.g. time domain representation or frequency domain representation) of the filtered inband reference by the scalar factor.

Multiplying a filtered inband reference by a positive scalar factor may for example include weighting/scaling the spectral content of the filtered inband reference by the scalar factor.

Multiplying a filtered inband reference by a negative scalar factor may for example include weighting/scaling the spectral content of the filtered inband reference by the magnitude of the scalar factor and changing a sign of the filtered inband reference.

The one or more other frequency subbands refer to one or more frequency subbands other than the frequency subband for which the current residual signal is computed.

Summing a filtered inband reference and one or more filtered crossband references may for example include superposition of spectral content of the respective signals, e.g. via component-wise addition in a frequency domain representation.

Adjusting the one or more scalar factors and the filter may for example include updating or modifying values of the one or more scalar factors and/or updating or modifying one or more coefficients employed by the filter.

Residual signals may for example be computed for some or all of the frequency subbands for updating respective filters and one or more scalar factors for some or all of the frequency subbands.

In example embodiments, the method may further comprise: receiving the reference signal and the response signal; decomposing the reference signal and the response signal into respective subband signals; downsampling the subband signals of the reference signal prior to applying the filters; and downsampling the subband signals of the response signal prior to computing the residual signal.

Downsampling of the subband signals reduces computational complexity of the audio processing and may for example increase convergence speed and/or tracking capability of the adaptive filtering provided by the method. Downsampling may cause aliasing between frequency subbands, which may be compensated for by employing the filtered crossband references.

The downsampling may for example be performed by resampling factors inversely proportional to the bandwidths of the respective frequency subbands.

For a given frequency subband, the corresponding subband signals of the reference signal and the response signal may for example be downsampled by the same resampling factor.

The reference signal may for example be decomposed using band pass filters or an analysis filter bank, e.g. a Quadrature Mirror Filter (QMF) analysis filter bank. Similarly, the response signal may for example be decomposed using band pass filters or an analysis filter bank, e.g. a QMF analysis filter bank.

In example embodiments, the adjustment may be performed to reduce power and/or energy of the residual signal. In other words, if the residual signal were to be computed based on the same reference signal and the same response signal, using the adjusted filter and the adjusted one or more scalar factors, it may have lower power and/or energy than when computed prior to adjusting the filter and the one or more scalar factors.

It will be appreciated that if a residual signal were to be computed based on new portions of the reference signal and the response signal, use of the adjusted filter and the adjusted one or more scalar factors need not necessarily result in a lower power and/or energy of the residual signal than use of the old (i.e. prior to adjusting it) filter and the old one or more scalar factors. Properties of a system providing the response signal in response to the reference signal (and which is to be modeled by the filter and the one or more scalar factors) may for example change over time, and the filter and the one or more scalar factors may for example be further adjusted later on to reduce power and/or energy of the residual signal.

In example embodiments, the residual signal may be computed for a time frame, or for a portion of a time frame. A new residual signal may be computed for a succeeding time frame, or for a succeeding portion of a time frame, based on the adjusted filter and the adjusted one or more scalar factors.

The new residual signal may for example be computed based on at least one new time frame, or portion of a time frame, of the subband signals of the reference signal and the response signal.

In example embodiments, the other frequency subbands (i.e. the frequency subbands for which filtered crossband references are formed) may include a neighboring frequency subband on either side of the frequency subband for which the current residual signal is computed.

Aliasing and/or other spectral leakage between frequency subbands may be larger between neighboring frequency subbands than between frequency subbands located further apart. Employing filtered crossband references for neighboring frequency subbands allows for compensating for such aliasing and/or such other spectral leakage.

The other frequency subbands may for example include at least two, three or four frequency subbands on either side of the frequency subband for which the current residual signal is computed.

In example embodiments, adjusting the one or more scalar factors and the filter applied to the subband signal of the reference signal corresponding to the frequency subband may include: modifying an update step size of the one or more scalar factors or of the filter applied to the subband signal of the reference signal corresponding to the frequency subband, in response to a power ratio between the subband signal of the reference signal corresponding to the frequency subband and the one or more filtered inband references of the one or more other frequency subbands exceeding an upper threshold or being below a lower threshold.

The subband signals of the reference signal and the filtered inband references obtained by filtering the subband signals of the reference signal may have different signal power and/or signal energy. In at least some optimization algorithms, this may cause different update step sizes to be used for the filter and the one or more scalar factors, and may lead to different adaption rates for the filter and for the one or more scalar factors. Modifying the update step size when the power or energy ratio is too large or too small allows for adjusting the adaption rates for the filter and/or the one or more scalar factors, e.g. to improve the overall convergence speed of the adaptive filtering.

The upper threshold and/or the lower threshold may for example be predefined.

In example embodiments, the response signal may be an audio signal provided by at least one acoustic transducer in response to playback, by at least one loudspeaker, of the reference signal.

The filter and the one or more scalar factors may for example serve to cancel audio content originating from the at least one loudspeaker in an audio signal from the at least one acoustic transducer. The filter and the one or more scalar factors may for example be adjusted to improve this cancellation.

The audio processing method may for example be employed for acoustic echo cancellation. The reference signal may for example be a signal received from a remote user during a telephone call. The residual signal may for example correspond to a subband portion of a signal transmitted (e.g. after additional processing such as leveling and attenuation of noise) back to the remote user. The residual signal may for example include audio content originating from a local user speaking in a vicinity of the at least one acoustic transducer.

The at least one acoustic transducer may for example include a microphone.

The at least one acoustic transducer may for example be arranged in a vicinity of the at least one loudspeaker, e.g. in the same room or acoustic environment as the at least one loudspeaker.

In example embodiments, the method may comprise, for each of the frequency subbands: computing a residual signal based on the filtered inband reference corresponding to the frequency subband and a subband signal of the response signal corresponding to the frequency subband; and adjusting, based on the residual signal for the frequency subband, at least the filter applied to the subband signal of the reference signal corresponding to the frequency subband. The method may further comprise: synthesizing an output signal based on the residual signals for the respective frequency subbands.

For each frequency subband, the residual signal may for example be computed as a difference between a composite filtered subband signal (formed as a sum of a filtered inband reference and one or more filtered crossband references) and a subband signal of the residual signal corresponding to the frequency subband. Alternatively, at least some of the residual signals may be computed as a difference between a filtered inband reference and a subband signal of the residual signal corresponding to the frequency subband, i.e. without use of one or more filtered crossband references.

For frequency subbands where a composite filtered reference is employed, both the filter applied to the to the subband signal of the reference signal corresponding to the frequency subband and one or more scalar factors employed to derive the composite filtered reference may for example be updated based on the residual signal.

The output signal may for example be synthesized using a synthesis filter bank, e.g. a QMF synthesis filter bank.

If the subband signals have been downsampled prior to applying the filters and computing the residual signals, the residual signals may for example be upsampled prior to synthesizing the output signal, e.g. by resampling factors being the inverses of the resampling factors employed when performing downsampling in the respective frequency subbands.

In example embodiments, the method may comprise: in response to a power level or energy level of a residual signal exceeding a threshold, dispensing with (or refraining from) adjustment of at least one filter or at least one scalar factor for at least one time frame.

An audio signal provided by the at least one acoustic transducer may include noise and/or audio content originating from other sources than the at least one loudspeaker. For example, there may be additional loudspeakers and/or one or more human speakers in a vicinity of the at least one acoustic transducer. A power level or energy level of a computed residual signal exceeding a threshold may be indicative of audio content originating from other sources than the at least one loudspeaker, and it may not be appropriate to update filters and/or scalar factors based on the residual signal. Adjustment of filters and/or scalar factors may therefore be postponed to later points in time or until later time frames, e.g. for which a new residual signal has been computed.

In e.g. telephone applications or teleconferencing applications, a power level or energy level of a residual signal exceeding a threshold may for example be indicative of doublespeak, i.e. a local user and a remote user talking simultaneously.

In example embodiments, the reference signal may be a multichannel signal. The method may comprise: receiving subband signals corresponding to audio content of channels of the reference signal in the respective frequency subbands; and applying respective filters to the subband signals of the channels of the reference signal. The method may comprise, for at least one frequency subband: for each channel of the reference signal, forming one or more filtered crossband references by multiplying, by one or more factors, one or more filtered inband references of one or more other frequency subbands of the channel; forming a composite filtered reference by summing, over the channels of the reference signal, the filtered inband references corresponding to the frequency subband and the respective associated one or more filtered crossband references; computing a residual signal as a difference between the composite filtered reference and the subband signal of the response signal corresponding to the frequency subband; and for at least one of the channels of the reference signal, adjusting, based on the residual signal, the one or more scalar factors for the channel and the filter applied to the subband signal of the channel of the reference signal corresponding to the frequency subband.

The plurality of channels of the reference signal may increase the computational complexity of the adaptive filtering. Compared to the entire additional filters employed in the example described above with reference to FIG. 2, the use of scalar factors to generate the filtered crossband references reduces the computational complexity. The reduction of the computational complexity compared to the example described with reference to FIG. 2 is greater when the reference signal is a multichannel signal than when the reference signal is a single-channel signal.

For a given subband, different filters may for example be applied to the subbands signals of the respective channels of the reference signal.

The reference signal may for example be a multichannel signal played back by a speaker system comprising multiple loudspeakers.

According to example embodiments, there is provided a computer program product comprising a computer-readable medium with instructions for performing any of the methods of the first aspect According to example embodiments, there is provided an audio processing system comprising a filtering section. The filtering section is configured to: receive subband signals corresponding to audio content of a reference signal in respective frequency subbands; receive subband signals corresponding to audio content of a response signal in the respective frequency subbands; and form filtered inband references by applying respective filters to the subband signals of the reference signal. The filtering section is configured to, for at least one frequency subband: form one or more filtered crossband references by multiplying, by one or more scalar factors, one or more filtered inband references of one or more other frequency subbands; form a composite filtered reference by summing the filtered inband reference corresponding to the frequency subband and the one or more filtered crossband references; compute a residual signal as a difference between the composite filtered reference and the subband signal of the response signal corresponding to the frequency subband; and adjust, based on the residual signal, the one or more scalar factors and the filter applied to the subband signal of the reference signal corresponding to the frequency subband.

Residual signals may for example be computed for some or all of the frequency subbands for updating respective filters and one or more scalar factors for some or all of the frequency subbands.

In example embodiments, the audio processing system may further comprise first and second analysis sections, and first and second resampling sections. The first analysis section may be configured to receive the reference signal and to decompose the reference signal into subband signals corresponding to respective frequency subbands. The second analysis section may be configured to receive the response signal and to decompose the response signal into subband signals corresponding to respective frequency subbands. The first resampling section may be arranged upstream of the filtering section and may be configured to downsample the subband signals of the reference signal. The second resampling section may be arranged upstream of the filtering section and may be configured to downsample the subband signals of the response signal.

The analysis sections may for example employ band pass filters to decompose the reference signal and the response signal. The analysis sections may for example be analysis filter banks, e.g. QMF analysis filter banks.

The resampling sections may for example provide downsampled versions of the subband signals of the reference signal and the response signal to the filtering section.

In example embodiments, the response signal may be an audio signal provided by at least one acoustic transducer in response to playback, by at least one loudspeaker, of the reference signal.

In example embodiments, the filtering section may be configured to, for each of the frequency subbands: compute a residual signal based on the filtered inband reference corresponding to the frequency subband and a subband signal of the response signal corresponding to the frequency subband; and adjust, based on the residual signal for the frequency subband, at least the filter applied to the subband signal of the reference signal corresponding to the frequency subband. The audio processing system may further comprise a synthesis section configured to synthesize an output signal based on the residual signals for the respective frequency subbands.

The residual signal for each frequency subband may for example be computed as a difference between a composite filtered subband signal (formed as a sum of a filtered inband reference and one or more filtered crossband references) and a subband signal of the residual signal corresponding to the frequency subband. Alternatively, at least some of the residual signals may for example be computed as a difference between a filtered inband reference and a subband signal of the residual signal corresponding to the frequency subband. For frequency subbands where a composite filtered reference is employed, both the filter applied to the to the subband signal of the reference signal corresponding to the frequency subband and one or more scalar factors employed to derive the composite filtered reference may for example be updated based on the residual signal.

If the subband signals have been downsampled prior to applying the filters and computing the reference signals, the audio processing system may for example comprise a third resampling section arranged upstream of the synthesis section and configured upsample the residual signals before the residual signals are employed to synthesize the output signal. The third resampling section may for example use resampling factors being inverses of the resampling factors employed when performing downsampling in the respective frequency subbands.

The synthesis section may for example be a synthesis filter bank, e.g. a QMF synthesis filter bank.

II. Overview—Power-Selective Filtering

According to a second aspect, example embodiments propose audio processing methods as well as systems and computer program products. The proposed methods, systems and computer program products, according to the second aspect, may generally share the same features and advantages.

According to example embodiments, there is provided an audio processing method comprising: receiving a response signal in the form of an audio signal provided by at least one acoustic transducer in response to playback, by at least one acoustic signal generator, of a reference signal. The method comprises: selecting, based on a power level of at least one of the reference signal and the response signal, a filter from a plurality of stored filters. The method comprises: applying the selected filter to the reference signal; computing a residual signal as a difference between the filtered reference signal and the response signal; and updating the selected filter based on the residual signal.

The at least one acoustic signal generator, the at least one acoustic transducer and the acoustic environment in which these are arranged may be regarded as a system providing the response signal as output in response to the reference signal. This system may be nonlinear due to nonlinearities of the at least one acoustic signal generator and/or the at least one acoustic transducer. In particular, an acoustic signal generator may respond differently to the reference signal depending on the power level of the reference signal, e.g. due to physical limitations of the acoustic signal generator. In other words, the system may be associated with different impulse responses (or transfer functions or frequency responses) for different power levels of the reference signal. The inventors have realized that such a system may be more accurately modeled (or approximated) by adaptive filtering if dedicated adaptive filters are stored and employed for different power levels, instead of using the same adaptive filter for all power levels. A reference signal with rapidly changing power level may for example cause the impulse response (or transfer function or frequency response) of the system to change rapidly although the system itself has not really changed. While a single adaptive filter modeling the system for all power levels would have to adapt to these rapid changes in order maintain good accuracy, adaptive filters dedicated to modeling the system at respective power levels may instead focus on adapting to other (e.g. less rapid) changes of the system. Selecting a filter based on a power level of the reference signal and/or the response signal, obtaining a residual signal based on the selected filter (and based on the reference signal and the response signal), and updating the selected filter based on the residual signal, allows for modeling the system (i.e. the system formed by the at least one acoustic signal generator, the at least one acoustic transducer and the acoustic environment in which these are arranged) at that power level. Such power-specific adaptive filtering allows for more accurate modeling than employing a single adaptive filter to model operation of the system at all power levels.

The at least one acoustic transducer may for example include a microphone.

The at least one acoustic signal generator may for example include a loudspeaker or headphones.

The selection of a filter may for example be based on a power level of the reference signal.

The selection of a filter may for example be based on a power level of the response signal.

Updating the selected filter may for example include replacing a current version of the selected filter by an updated version of the selected filter in a storage section or memory.

The filters may for example be multitap filters, e.g. finite impulse response (FIR) filters.

Updating the selected filter may for example include adjusting or modifying one or more coefficients employed by the selected filter.

In example embodiments, the selected filter may be updated to reduce power and/or energy of the residual signal. In other words, if the residual signal were to be computed based on the same reference signal and the same response signal, using the updated selected filter, it may have lower power and/or energy than when computed prior to updating the selected filter.

It will be appreciated that if a residual signal were to be computed based on new portions of the reference signal and the response signal, use of the updated selected filter need not necessarily result in a lower power and/or energy of the residual signal than use of the old (i.e. prior to updating it) selected filter. Properties of the system providing the response signal in response to the reference signal (i.e. a system including the at least one acoustic signal generator, the at least one acoustic transducer and the acoustic environment in which they are arranged) may for example change over time, and the selected filter may for example be further updated later on to reduce power and/or energy of the residual signal.

In example embodiments, the method may comprise: receiving the reference signal; and estimating a power level of at least one of the reference signal and the response signal. The selection of a filter may for example be based on the estimated power level.

In example embodiments, the selection of a filter may be made for a time frame, or for a portion of a time frame, and a new selection may be made for a succeeding time frame, or for a succeeding portion of a time frame, from the plurality of stored filters in which the selected filter has been updated.

The selection of a filter may for example be made for a time frame, or for a portion of a time frame, of the reference signal and/or of the response signal. The new selection may for example be made for a succeeding time frame, or for a succeeding portion of a time frame, of the reference signal and/or of the response signal.

A new residual signal may for example be computed for a succeeding time frame, or for a succeeding portion of a time frame, based on the newly selected filter. The new residual signal may for example be computed based on at least one new time frame, or portion of a time frame, of the reference signal and the response signal.

In example embodiments, the method may comprise, for each of a plurality of power levels: providing a reference signal having the power level; receiving a response signal in the form of an audio signal provided by the at least one acoustic transducer in response to playback, by the at least one acoustic signal generator, of the reference signal having the power level; selecting, based on the power level, a filter from a plurality of stored filters; applying the selected filter to the reference signal having the power level; computing a residual signal as a difference between the filtered reference signal and the response signal for the power level; and updating the selected filter based on the residual signal for the power level.

The reference signals may for example be provided with the purpose of adjusting the filters (based on the residual signals) for improving modeling of the system formed by the at least one acoustic signal generator, the at least one acoustic transducer and the acoustic environment in which these are arranged. Providing reference signals at a plurality of different power levels allows for improving modeling of the system for these different power levels.

Providing a reference signal having the power level may for example comprise generating or synthesizing a reference signal having the power level. The reference signals may for example be generated from white noise or pink noise. The reference signal may for example be generated via use of pulse width modulation or sine wave sweeps.

Providing a reference signal having the power level may for example comprise providing (or retrieving) a reference signal having the power level from a storage or memory.

The power levels of the reference signals may for example be known a priori and there may be no need to estimate the power levels of the reference signals in order to select the filters.

In example embodiments, the method may comprise: cancelling, based on at least one of the filters, audio content originating from the at least one acoustic signal generator in an audio signal provided by the at least one acoustic transducer.

The filters may be indicative of outputs provided by the at least one acoustic transducer in response to playback, by the at least one acoustic signal generator, of residual signals (e.g. if the filters have been appropriately updated or adjusted based on respective residual signals). For a given reference signal played back by the at least one acoustic signal generator, at least one of the filters may for example be employed to predict an expected response by the at least one acoustic transducer. Audio content originating from the at least one acoustic transducer may for example be cancelled from an audio signal provided by the at least one acoustic transducer by subtracting the predicted response from the audio signal provided by the at least one acoustic transducer.

The method may for example be employed for acoustic echo cancellation.

The method may for example comprise: receiving a second reference signal; receiving a second response signal in the form of an audio signal provided by the at least one acoustic transducer in response to playback, by the at least one acoustic signal generator, of the second reference signal; estimating a power level of the second reference signal; selecting, based on the power level of the second reference signal, a second filter from the plurality of stored filters; applying the selected second filter to the second reference signal; and cancelling audio content originating from the at least one acoustic signal generator by subtracting the filtered second reference signal from the second response signal.

In example embodiments, the method may comprise: receiving an audio signal; estimating a power level of the audio signal; selecting, based on the power level of the audio signal, a filter from the plurality of stored filters; and calculating, based on the filter selected for the audio signal, an equalization filter for use during playback, by the at least one acoustic signal generator, of the audio signal.

The filter selected for the audio signal may be indicative of an acoustic output provided by the at least one acoustic signal generator when playing back the received audio signal. The equalization filter may be employed to adjust a balance between frequency components in the audio signal prior to the audio signal being played back by the at least one acoustic signal generator. To obtain a desired balance between frequency components in the acoustic output actually provided by the acoustic signal generator, the equalization filter may be calculated based on the selected filter.

In example embodiments, the method may comprise: in response to a power level or energy level of the residual signal exceeding a threshold, dispensing with updating of the selected filter for at least one time frame.

An audio signal provided by the at least one acoustic transducer may include noise and/or audio content originating from other sources than the at least one acoustic signal generator. For example, there may be additional loudspeakers and/or one or more human speakers in a vicinity of the at least one acoustic transducer. A power level or energy level of the computed residual signal exceeding a threshold may be indicative of audio content originating from other sources than the at least one acoustic signal generator, and it may not be appropriate to update the selected filter based on the residual signal. Updating the selected filter may therefore be postponed to later points in time or until later time frames, e.g. for which a new residual signal has been computed.

In e.g. telephone applications or teleconferencing applications, a power level or energy level of a residual signal exceeding a threshold may for example be indicative of doublespeak, i.e. a local user and a remote user talking simultaneously.

In example embodiments, the method may further comprise: providing an alternatively filtered reference signal by applying, regardless of the power level on which the selection of the filter is based, an alternative filter to the reference signal; computing an alternative residual signal as a difference between the alternatively filtered reference signal and the response signal; updating the alternative filter based on the alternative residual signal; and selecting between the residual signal and the alternative residual signal based on power levels or energy levels of the residual signal and the alternative residual signal.

Some of the filters in the plurality of filters may not be selected very often and may therefore not have been updated for quite some time when finally selected based on the power level of the reference signal and/or the response signal. In such situations, a conventional adaptive filter which is updated regardless of the power level may for example temporarily provide a more accurate approximation than the filter selected based on the power level (i.e. it may correspond to a residual signal with lower power or energy).

The one of the residual signal and the alternative residual signal with the lowest power level and/or energy level may for example be selected.

In example embodiments, the method may comprise: decomposing the reference signal and the response signal into subband signals corresponding to respective frequency subbands. The method may comprise, for each of the frequency subbands: selecting, based on a power level of at least one of the subband signal of the reference signal corresponding to the frequency subband and the subband signal of the response signal corresponding to the frequency subband, a filter from a plurality of stored filters for the frequency subband; applying the selected filter for the frequency subband to the subband signal of the reference signal corresponding to the frequency subband; computing a residual signal as a difference between the filtered subband signal and the subband signal of the response signal corresponding the frequency subband; and updating the selected filter for the frequency subband based on the residual signal for the frequency subband.

By employing separate filters in the respective subbands, different update step sizes for the filters may for example be employed in the different subbands, depending on the energy of the reference signal in the respective subbands. This may for example improve the overall adaption rate.

The reference signal may for example be decomposed from a fullband signal into subband signals using band pass filters or an analysis filter bank, e.g. a Quadrature Mirror Filter (QMF) analysis filter bank. Similarly, the response signal may for example be decomposed using band pass filters or an analysis filter bank, e.g. a QMF analysis filter bank.

The subband signals of the reference signal and the response signal may for example be downsampled to reduce computational complexity.

The adaptive filtering may for example be performed independently for the respective frequency subbands.

The computed residual signals may for example be synthesized into a fullband output signal, e.g. by a synthesis filter bank such as a QMF synthesis filter bank. The residual signals may for example be upsampled before the output signal is synthesized.

According to example embodiments, there is provided a computer program product comprising a computer-readable medium with instructions for performing any of the methods of the second aspect According to example embodiments, there is provided an audio processing system configured to receive a response signal in the form of an audio signal provided by at least one acoustic transducer in response to playback, by at least one acoustic signal generator, of a reference signal. The audio processing system comprises a storing section, a control section, and a filtering section. The storing section is configured to store a plurality of filters. The control section is configured to select, based on a power level of at least one of the reference signal and the response signal, a filter from the plurality of stored filters. The filtering section is configured to apply the selected filter to the reference signal, compute a residual signal as a difference between the filtered reference signal and the response signal, and determine an updated version of the selected filter based on the residual signal. The storing section is configured to store the updated version of the selected filter.

The storing section may for example be configured to replace an earlier version the selected filter by the updated version of the selected filter.

The storing section may for example include a memory and/or a look-up table.

In example embodiments, the audio processing system may be configured to receive the reference signal, and the control section may be configured to estimate a power level of at least one of the reference signal and the response signal. The control section may for example be configured to make the selection of a filter based on the estimated power level.

In example embodiments, the control section may be configured to provide a plurality of reference signals having respective different power levels. The audio processing system may be configured to receive response signals in the form of audio signals provided by the at least one acoustic transducer in response to playback, by the at least one acoustic signal generator, of the respective reference signals. The control section may be configured to select filters from the plurality of stored filters based on the respective power levels. The filtering section may be configured to apply the selected filters to the respective reference signals, compute residual signals as differences between the respective filtered reference signals and the respective response signals, and determine updated versions of the selected filters based on the respective residual signals. The storing section may be configured to store the updated versions of the selected filters.

In example embodiments, the audio processing system may further comprise an additional filtering section arranged in parallel to the filtering section. The additional filtering section may be configured to, regardless of the power level on which the selection of the filter is based: provide an alternatively filtered reference signal by applying an alternative filter to the reference signal; compute an alternative residual signal as a difference between the alternatively filtered reference signal and the response signal; and update the alternative filter based on the alternative residual signal. The audio processing system may further comprise an output section configured to select between the residual signal and the alternative residual signal based on power levels or energy levels of the residual signal and the alternative residual signal.

The output section may for example be configured to select the one of the residual signal and the alternative residual signal with the lowest power level and/or energy level.

III. Example Embodiments—Cross Filtering

Figure 3:
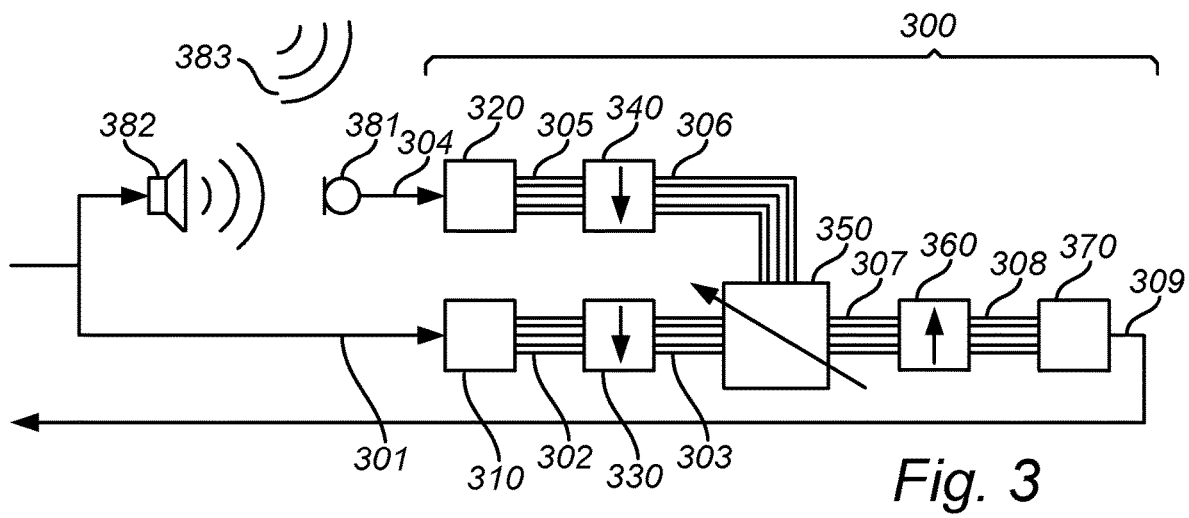
FIG. 3 is a generalized block diagram of an audio processing system, according to an example embodiment.

FIG. 3 is a generalized block diagram of an audio processing system 300, according to an example embodiment. The audio processing system 300 comprises a first analysis section 310, a second analysis section 320, a first resampling section 330, a second resampling section 340, a filtering section 350, a third resampling section 360 and a synthesis section 370. The first analysis section 310 receives a reference signal 301 and decomposes the reference signal 301 into subband signals 302 corresponding to respective frequency subbands. The first resampling section 330 downsamples the subband signals 302 of the reference signal 301 and provides the downsampled subband signals 303 of the reference signal 301 to the filtering section 350. The second analysis section 320 receives a response signal 304 and decomposes the response signal 304 into subband signals 305 corresponding to respective frequency subbands. The second resampling section 340 downsamples the subband signals 305 of the response signal 304 and provides the downsampled subband signals 306 of the response signal 304 to the filtering section 350. The filtering section 350 computes residual signals 307 for the respective frequency subbands based on the downsampled subband signals 303 and 306 of the reference signal 301 and the response signal 304. The filtering section 350 will be described below with reference to FIG. 4. The third resampling section 360 upsamples the residual signals 307 and provides the upsampled residual signals 308 to a synthesis section 370 which synthesizes an output signal 309 based on the upsampled residual signals 308.

The first and second analysis sections 310 and 320 may for example employ band pass filters to decompose the reference signal 301 and the response signal 304 into subband signals. The first and second analysis sections 310 and 320 may for example be analysis filter banks, e.g. Quadrature Mirror Filter (QMF) analysis filter banks. The first analysis section 310 may for example decompose the reference signal 301 from a fullband signal into subband signals 302 of equal bandwidths, or into subband signals 302 of different bandwidths. Similarly, the second analysis section 320 may for example decompose the response signal 304 from a fullband signal into subband signals 305 of equal bandwidths, or into subband signals 305 of different bandwidths. The first and second analysis sections 310 and 320 may for example decompose the reference signal 301 and the response signal 304 into subband signals 302 and 305 corresponding to the same frequency subbands. The first and second analysis sections 310 and 320 may for example transform the reference signal 301 and the response signal 304 from a time domain to a frequency domain, e.g. to a QMF domain.

The first resampling section 330 may for example downsample the subband signals 302 of the reference signal 301 by factors inversely proportional to the bandwidths of the respective subband signals 302 of the reference signal 301. Similarly, the second resampling section 340 may for example downsample the subband signals 305 of the response signal 304 by factors inversely proportional to the bandwidths of the respective subband signals 305 of the response signal 304. The first and second resampling sections 320 and 340 may for example employ the same resampling factors for subband signals corresponding to the same frequency subband.

The third resampling section 360 may for example upsample the residual signals 307 by resampling factors which are the inverses of the resampling factors employed by the first and second resampling sections 330 and 340 for downsampling the subband signals 302 and 305 of the reference signal 301 and the response signal 304. In other words, the third resampling section 360 may for example restore the original sampling rate of the reference signal 301 and the response signal 304. The third resampling section 360 may for example upsample the residual signals 307 by resampling factors proportional to the bandwidths of the corresponding frequency subbands.

The synthesis section 370 may for example be a synthesis filter bank, e.g. a QMF synthesis filter bank. The synthesis section 370 may for example transform the upsampled residual signals 308 into a fullband output signal 309. The synthesis section 370 may for example perform a transformation from a frequency domain, e.g. a QMF domain, to a time domain.

The response signal 304 is exemplified herein by an audio signal provided by at least one acoustic transducer 381 in response to playback, by at least one loudspeaker 382, of the reference signal 301. In other words, the response signal 304 may include audio content originating from the loudspeaker 382. The response signal 304 may also include audio content originating from other sound sources 383, such as other loudspeakers or a human speaker in a vicinity of the acoustic transducer 381. The response signal 304 may comprise noise, e.g. in the form of ambient noise from a room in which the acoustic transducer 381 is arranged. The acoustic transducer 381 may for example be a microphone. The at least one loudspeaker 382 may for example include multiple loudspeakers.

Figure 4:
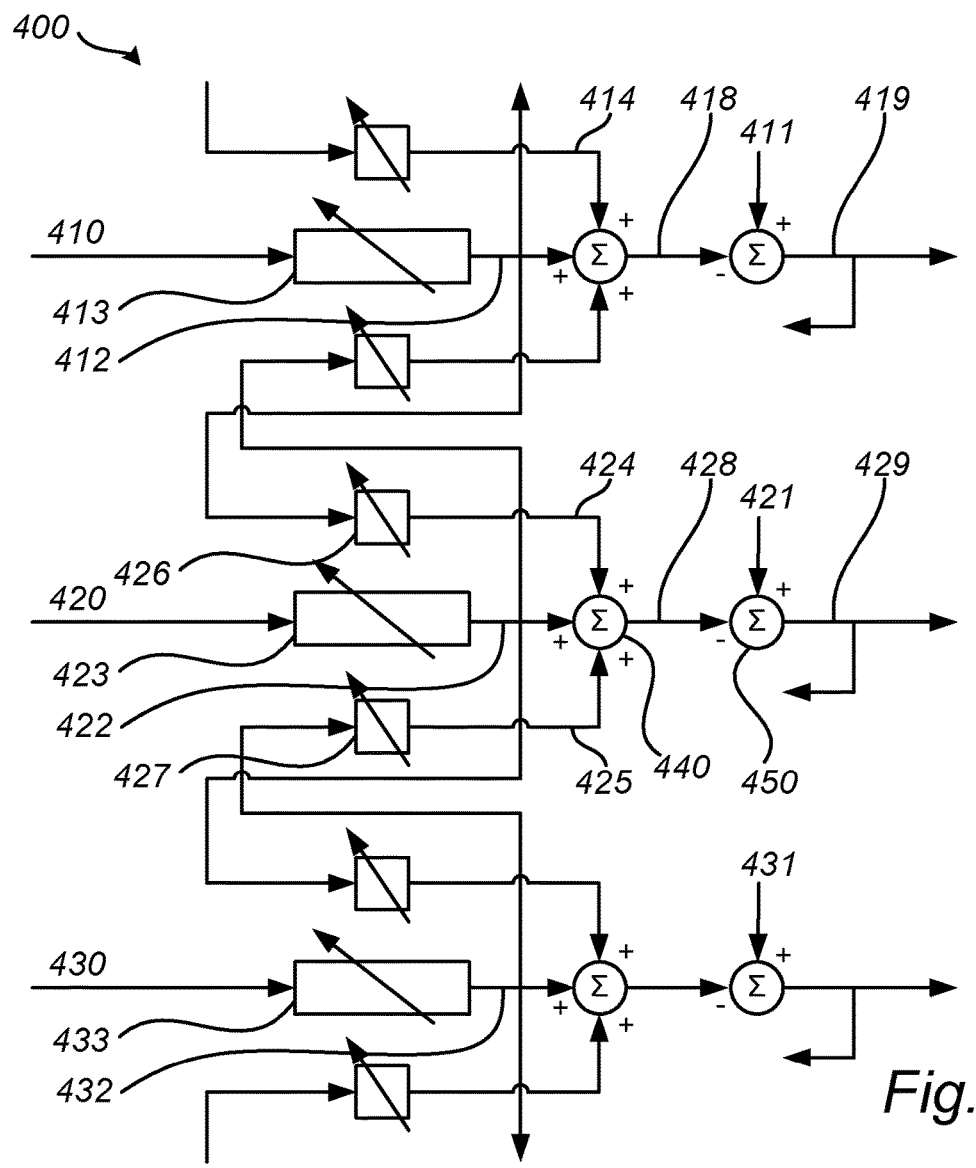
FIG. 4 is a generalized block diagram of parts of a filtering section for use in an audio processing system, according to an example embodiment.

FIG. 4 is a generalized block diagram of parts of a filtering section 400 for use in an audio processing system, according to an example embodiment. The filtering section 400 may for example be employed as the filtering section 350 in the audio processing system 300 described with reference to FIG. 3.

The filtering section 400 receives subband signals 410, 420 and 430 corresponding to audio content of a reference signal (e.g. the reference signal 301 described with reference to FIG. 3) in respective frequency subbands. The filtering section 400 also receives subband signals 411, 421 and 431 corresponding to audio content of a response signal (e.g. the response signal 304 described with reference to FIG. 3) in the respective frequency subbands. The filtering section 400 forms filtered inband references 412, 422, and 432 by applying respective filters 413, 423 and 433 to the subband signals 410, 420 and 430 of the reference signal.

For at least one frequency subband, the filtering section 400 forms filtered crossband references 424 and 425 by multiplying, by scalar factors 426 and 427, filtered inband references 412 and 432 of other frequency subbands. The filtering section 400 forms a composite filtered reference 428 by summing the filtered inband reference 422 corresponding to the frequency subband and the filtered crossband references 424 and 425. The filtering section 400 may for example comprise an adding section 440 configured to perform the summation. The summation may for example include superposition of spectral content of the respective audio signals, e.g. via component-wise addition in a frequency domain representation.

The one or more scalar factors may for example be real numbers which may be positive or negative. If e.g. complex-valued representations (such as complex-valued frequency domain representations) are employed to represent the audio signals, the scalar factors may for example be complex-valued.

Multiplying a filtered inband reference by a scalar factor may for example include multiplying coefficients in a representation (e.g. time domain representation or frequency domain representation) of the filtered inband reference by the scalar factor.

The filtering section 400 computes a residual signal 429 as a difference between the composite filtered reference 428 and the subband signal 421 of the response signal corresponding to the frequency subband. The filtering section 400 may for example comprise a difference section 450 configured to form the difference. The difference may for example be computed via component-wise subtraction in a frequency domain representation of the audio signals.

The filtering section 400 then adjusts, based on the residual signal 429, the scalar factors 426 and 427 and the filter 423 applied to the subband signal 420 of the reference signal corresponding to the frequency subband.

Forming the residual signal 429 based on both the filtered inband reference 428 and the filtered crossband references 424 and 425 (and adjusting, based on the residual signal 429, the scalar factors 426 and 427 and the filter 423 applied to the subband signal 420 corresponding to the frequency subband) allows for compensating for aliasing and/or other spectral leakage between the frequency subbands corresponding to the subband signals of 410, 420 and 430 of the reference signal. Aliasing and/or other spectral leakage between frequency subbands may for example be caused by downsampling, insufficient band-isolation for filters employed to decompose the reference signal and/or the response signal into subband signals, and/or nonlinearities in the system which provides the response signal in response to the reference signal (such a system is exemplified in FIG. 3 by a system including a loudspeaker 382 which may be nonlinear). Filters employed for decomposing audio signals into subband signals often overlap. A band-pass filter employed to provide one of the subband signals may for example overlap one or more band-pass filters employed to provide other subband signals. Design of filters for decomposing an audio signal into subband signals involves a tradeoff between different properties and it may not be possible in a given system to provide good enough band isolation to avoid aliasing and/or other spectral leakage between frequency subbands.

A power level and/or energy level of the residual signal 429 may be indicative of an error or incompleteness of an approximation of the subband signal 421 of the response signal provided by the filter 423 and the scalar factors 426 and 427 based on the subband signals 410, 420 and 430 of the reference signal. Compensating for aliasing and/or other spectral leakage between frequency subbands, e.g. by appropriately adjusting the filter 423 and the scalar factors 426 and 427 based on the residual signal 429, allows for reducing energy or power of the residual signal 429.

The other frequency subbands employed for forming the filtered crossband references 424 and 425 are exemplified herein by the two neighboring frequency subbands. In other words, the two neighboring filtered inband references 412 and 432 are employed to form the filtered crossband references 424 and 425 employed to compute the residual signal 429. Although aliasing and/or other spectral leakage may be largest between neighboring frequency subbands, it may also occur between other frequency subbands. It will be appreciated that the composite filtered reference 428 may be formed as a sum of the filtered inband reference 422 and any number of filtered crossband references. The composite filtered reference 428 may for example be formed as a sum of the filtered inband reference 422 and a single filtered crossband reference, or a sum of the filtered inband reference 422 and at least one, two, three or four filtered crossband references from either side of the current frequency subband.

The filtering section 400 may compute residual signals for other frequency subbands analogously. Residual signals may for example be computed for all frequency subbands.

For a given frequency subband, a residual signal 419 may for example be computed as a difference between a composite filtered subband signal 418 (formed as a sum of a filtered inband reference 412 and filtered crossband references 414 and 415) and a subband signal 411 of the residual signal corresponding to the frequency subband. For frequency subbands which are not as important for the perceived audio quality (e.g. due to psycho-acoustic effects and/or properties of the human hearing system), there may be no need to compensate for aliasing or spectral leakage between frequency subbands. For such a frequency subband, a residual signal may be computed as a difference between a filtered inband reference 412 and a subband signal 411 of the residual signal corresponding to the frequency subband, i.e. without use of filtered crossband references 414 and 415. For frequency subbands where no filtered crossband references are employed for computing the residual signal, e.g. only the filter 413 applied to the subband signal 410 in that frequency subband may be adjusted based on the residual signal.

FIG. 4 illustrates processing of subband signals in three frequency subbands. It will be appreciated that the filtering section 400 may comprise additional parts for receiving and processing subband signals corresponding to other frequency subbands. It will be appreciated that filtering sections according to example embodiments may be configured to receive and process subband signals for any number of frequency subbands.

The filters 413, 423 and 433 applied to the subband signals 410, 420 and 430 of the reference signal may for example be multitap filters, e.g. finite impulse response (FIR) filters including multiple coefficients. The number of taps of the filters may for example correspond to the length or duration of an impulse response of a system which the filters are to model. In the example application described with reference to FIG. 3, the system to be modeled includes an acoustic transducer 381 picking up an audio signal played back by a loudspeaker 382. For such an application, the number of taps of the filters 413, 423 and 433 may for example correspond to at least the time it takes for an audio signal to travel from the loudspeaker 382 to the acoustic transducer 381, e.g. including the time it takes for the audio signal to be reflected off walls before reaching the acoustic transducer 381. The number of scalar factors 426 and 427 employed by the filtering section 400 may be independent of the length of the impulse response. In contrast, the additional filters employed in the filtering scheme described with reference to FIG. 2 (to compensate for aliasing) have the same number of taps as the regular filters (i.e. the number of taps corresponds to the length of the impulse response of the system to be modeled). Hence, the computational complexity of the filtering scheme described with reference to FIG. 2 increases as a function of the length of the impulse response of the system to be modeled.

The reduced computational complexity provided by the filtering section 400 allows for increasing the adaption rate of the adaptive filtering, allowing for improved tracking of time-varying systems.

The scalar factors 426 and 427 may for example be real numbers which may be positive or negative. If e.g. complex-valued representations are employed to represent the audio signals, the scalar factors may for example be complex-valued.

Multiplying a filtered inband reference 412 by a scalar factor 426 may for example include multiplying coefficients in a frequency domain representation (or a time domain representation) of the filtered inband reference 412 by the scalar factor 426. Multiplying a filtered inband reference 412 by a positive scalar factor may for example include weighting the spectral content of the filtered inband reference 412 by the scalar factor 426. Multiplying a filtered inband reference 412 by a negative scalar factor 426 may for example include weighting the spectral content of the filtered inband reference 412 by the magnitude of the scalar factor 426 and changing a sign of the filtered inband reference 412.

Summing filtered inband references may for example include superposition of spectral content of the filtered inband references, e.g. via component-wise addition in a frequency domain representation.

Summing a filtered inband reference 422 and the filtered crossband references 424 and 425 may for example include superposition of spectral content of the respective signals, e.g. via component-wise addition in a frequency domain representation.

Adjusting the scalar factors 426 and 427 and the filter 423 may for example include updating or modifying values of the scalar factors 426 and 427 and/or updating or modifying one or more coefficients employed by the filter 423. The filter 423 and the scalar factors 426 and 427 may for example be adjusted to reduce power and/or energy of the residual signal 429.

Figure 7:
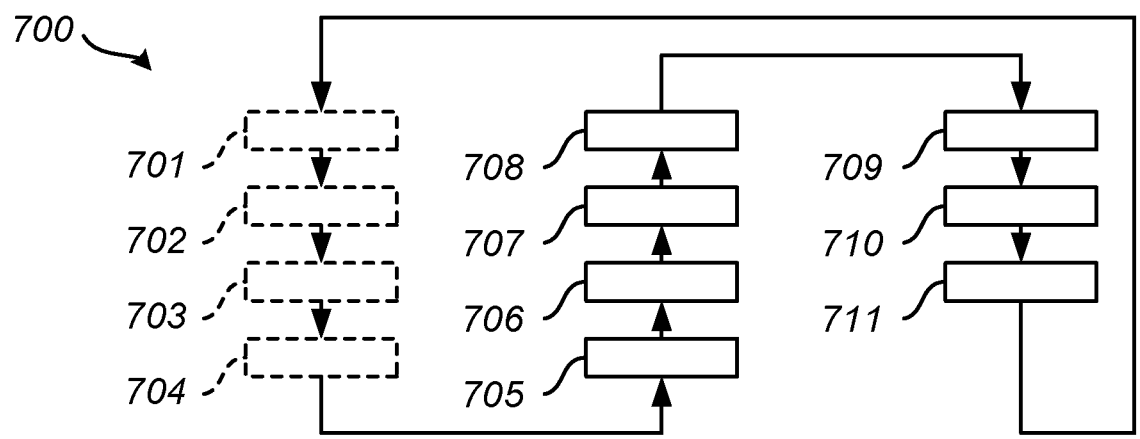
FIG. 7 is a flow chart of an audio processing method, according to an example embodiment.

An audio processing method 700, according to an example embodiment, will now be described with reference to FIG. 7. The method 700 may for example be performed by the audio processing system 300 described with reference to FIG. 3 and/or the filtering section described with reference to FIG. 4.

The method 700 comprises receiving 705 subband signals corresponding to audio content of a reference signal in respective frequency subbands, receiving 706 subband signals corresponding to audio content of a response signal in the respective frequency subbands, and forming 707 filtered inband references by applying respective filters to the subband signals of the reference signal. The method 700 comprises forming 708, for at least one frequency subband, one or more filtered crossband references by multiplying, by one or more scalar factors, one or more filtered inband references of one or more other frequency subbands. The method 700 comprises forming 709, for the at least one frequency subband, a composite filtered reference by summing the filtered inband reference corresponding to the frequency subband and the one or more filtered crossband references. The method 700 comprises computing 710, for the at least one frequency subband, a residual signal as a difference between the composite filtered reference and the subband signal of the response signal corresponding to the frequency subband. The method 700 comprises adjusting 711, for the at least one frequency subband and based on the residual signal, the one or more scalar factors and the filter applied to the subband signal of the reference signal corresponding to the frequency subband.

The residual signal (e.g. the residual signal 429 computed by the filtering section 400 described with reference to FIG. 4) may be computed for a time frame, or for a portion of a time frame. Once the filter and the at least one scalar factor have been adjusted, the method returns to the step of receiving 705 a new time frame (or a portion of a time frame) of the subband signals of the reference signal and receiving 706 a new time frame (or a portion of a time frame) of the subband signals of the response signal. A new residual signal is then computed for a succeeding time frame, or for a succeeding portion of a time frame, based on the adjusted filter and the adjusted one or more scalar factors. The filters and scalar factors may for example be adjusted to reduce power and/or energy of the residual signal. The filters and scalars may for example be adjusted using an optimization algorithm. The filters and scalars may for example be adjusted using a least mean squares (LMS) algorithm (e.g. a normalized LMS algorithm).

The method 700 may for example comprise the additional steps of receiving 701 the reference signal and the response signal, decomposing 702 the reference signal and the response signal into respective subband signals, downsampling 703 the subband signals of the reference signal prior to applying the filters, and downsampling 704 the subband signals of the response signal prior to computing the residual signal. These additional steps may for example be performed by the analysis sections and the resampling sections described with reference to FIG. 3.

Figure 8:
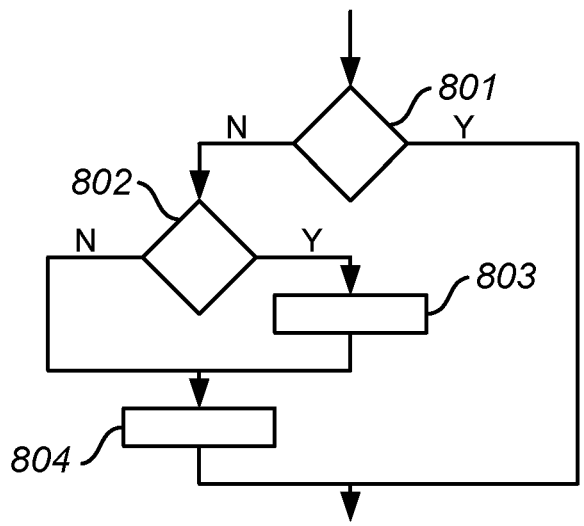
FIG. 8 is a flow chart of a portion of an audio processing method, according to an example embodiment.

The step of adjusting 711 the filter and the one or more scalar factors may for example comprise a number of sub-steps which will now be described with reference to FIG. 8.

After computing 710 the residual signal (e.g. the residual signal 429 described with reference to FIG. 4), the method 700 may for example include determining 801 whether a power level or an energy level of the residual signal exceeds a threshold. If the threshold is exceeded, this may be an indication that the response signal includes audio content originating from other sources than the reference signal (as exemplified in FIG. 3 by the additional sound source 383). It may therefore be inappropriate to adjust the filter (e.g. filter 423 described with reference to FIG. 4) and the one or more scalar factors (e.g. scalar factors 426 and 427 described with reference to FIG. 4) based on the residual signal. Hence, if the threshold is exceeded, which is indicated by an outgoing branch labeled Y from the decision box 801, the adjustment of the filter and the scalar factors may be dispensed with for one or more time frames. If the threshold is not exceeded, which is indicated by an outgoing branch labeled N from the decision box 801, the method 700 may continue by determining how to update the filter and the scalar factors. The threshold may for example be predefined. The threshold may for example be updated or adjusted based on the performance of the adaptive filtering.

The filter (e.g. filter 423 described with reference to FIG. 4) is applied to a subband signal of the reference signal while the scalar factors (e.g. scalar factors 426 and 427 described with reference to FIG. 4) are applied to filtered inband references (e.g. the filtered inband references 412 and 432 described with reference to FIG. 4). The subband signal and the filtered inband references may have different power levels. This could potentially lead to different adaption rates for the filter and the scalar factors. If for example the conventional normalized least mean squares algorithm is employed, the update equations may be written as:

$$A(k, n+1) = A(k, n) + \mu \frac{r(k, n)e^*(k, n)}{\|r(k, n)\|^2 + \|y(k, n)\|^2 + \varepsilon} \quad (1)$$

and $$C(k, n+1) = (k, n) + \mu \frac{y(k, n)e^*(k, n)}{\|r(k, n)\|^2 + \|y(k, n)\|^2 + \varepsilon}, \quad (2)$$

where the vector A(k, n) represents the filter for the subband k and the time frame n, and C(k, n) represents all the scalar factors associated with the subband k (e.g. by putting the scalar factors 426 and 427 in one vector). The vector r(k, n) is the input history of the filter A(k, n), i.e. previous time frames of the subband signal of the reference signal still taken into account by the filter A(k, n). The vector y(k, n) represents the filtered inband references of the neighboring bands to which the scalar factors are multiplied (e.g. the filtered inband references 412 and 432 described with reference to FIG. 4). The scalar e*(k, n) is the conjugate the residual signal. Here, μ is an overall step size parameter and ε is a small regularization term. If the signal powers ∥r(k, n)∥² and ∥y(k, n)∥² are of different magnitudes, then equations 1 and 2 may lead to different adaption rates for A(k, n) and C(k, n), which may increase the overall convergence time.

One way to provide more similar adaption rates is to rescale the filtered inband references y(k, n) according to $$y_N(k, n) = \frac{y(k, n)}{|A(k, n)| + \varepsilon}, \quad (3)$$

and to employ $y_N(k, n)$ in equations 1 and 2 instead of y(k, n). Here |A(k, n)| represents the norm of the filter A(k, n). However, there may be no need to rescale the filtered inband references y(k, n) unless the power levels of the subband signal r(k, n) of the reference signal and the filtered inband references y(k, n) are of different magnitudes. The method 700 may therefore comprise determining 802 whether a power ratio between the subband signal r(k, n) and the filtered inband references y(k, n) exceeds an upper threshold T2 or is below a lower threshold T1. If not, i.e. if the following condition is satisfied $$T1 \leq \frac{\|r(k, n)\|^2}{\|y(k, n)\|^2} \leq T2, \quad (4)$$

then the method 700 may continue by adjusting 804 the filter and the scalar factors, e.g. using equations 1 and 2. This is indicated by the outgoing arrow labeled N from the decision box 802. If a power ratio of the subband signal and the filtered reference signals exceeds the upper threshold T2 or is below the lower threshold T1, i.e. if the condition 4 is not met, then the rescaled filtered inband references $y_N(k, n)$ from equation 3 may be employed in when adjusting the filter and the scalar factors according to equations 1 and 2. This is indicated by the outgoing arrow labeled Y from the decision box 802. The method 700 may therefore include the step of modifying 803 the update step size of the filter and/or the scalar factors via use of equation 3 before applying equations 1 and 2 to adjust the filter and the scalar factors.

In some example embodiments, equation 3 is employed for rescaling the filtered inband references y(k, n) if the norm of the filter A(k, n) has changed by a certain factor, e.g. by a factor 10. In other words, there may for example be no need to rescale the filtered inband references y(k, n) using equation 3 until the norm of the filter A(k, n) has changed by a factor 10.

The audio processing system 300 described with reference to FIG. 3 (which may include the filtering section 400 described with reference to FIG. 4) may for example be employed for acoustic echo cancellation (AEC). Audio content from a remote user may be played back by the loudspeaker 382 to be heard by a local user. The local user may speak 383 into the acoustic transducer 381 (e.g. a microphone). Audio content from the remote user may also be picked up by the acoustic transducer 381 but may be cancelled by the audio processing system 300. The residual signal 309, from which echo has been cancelled may then be transmitted to the remote user, e.g. after additional audio processing.

The audio processing system 300 (and/or the filtering section 400) may for example perform AEC in real time during a phone call or during a teleconference. The filters and scalar factors may then be adjusted based on the residual signal when the local user 383 is silent, and the adjusted filters and scalar factors may then be used for cancelling echo also when the local user 383 speaks.

The audio processing system 300 (and/or the filtering section) may for example perform AEC on a recorded response signal provided by an acoustic transducer (e.g. microphone) in response to a reference signal. In such an application, look-ahead may for example be employed to determine suitable values for the filters and scalar factors. Alternatively or additionally, once suitable values for the filters and scalar factors have been obtained, it may be possible to move back and employ such values to perform AEC on earlier time frames of the recorded response signal. Suitable initial values for the filters and the scalar factors may for example be determined prior to a phone call, e.g. based on recorded reference signals and associated recorded response signals, and the filters and scalar factors may then be adjusted further during the phone call to track changing conditions.

Figure 5:
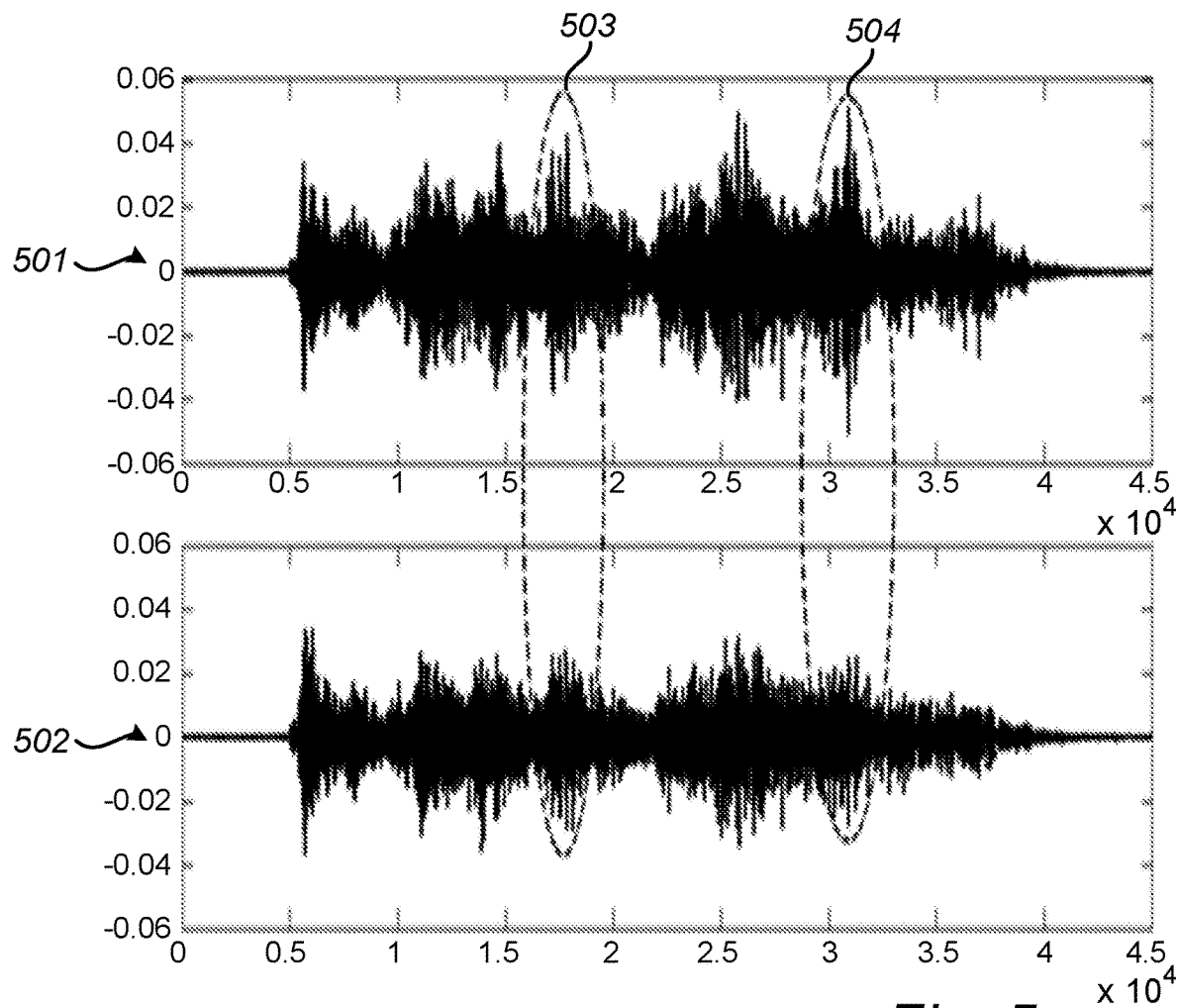
FIG. 5 illustrates example residual signals obtained after acoustic echo cancellation with and without compensation for aliasing and/or other types of spectral leakage between frequency subbands.
Figure 6:
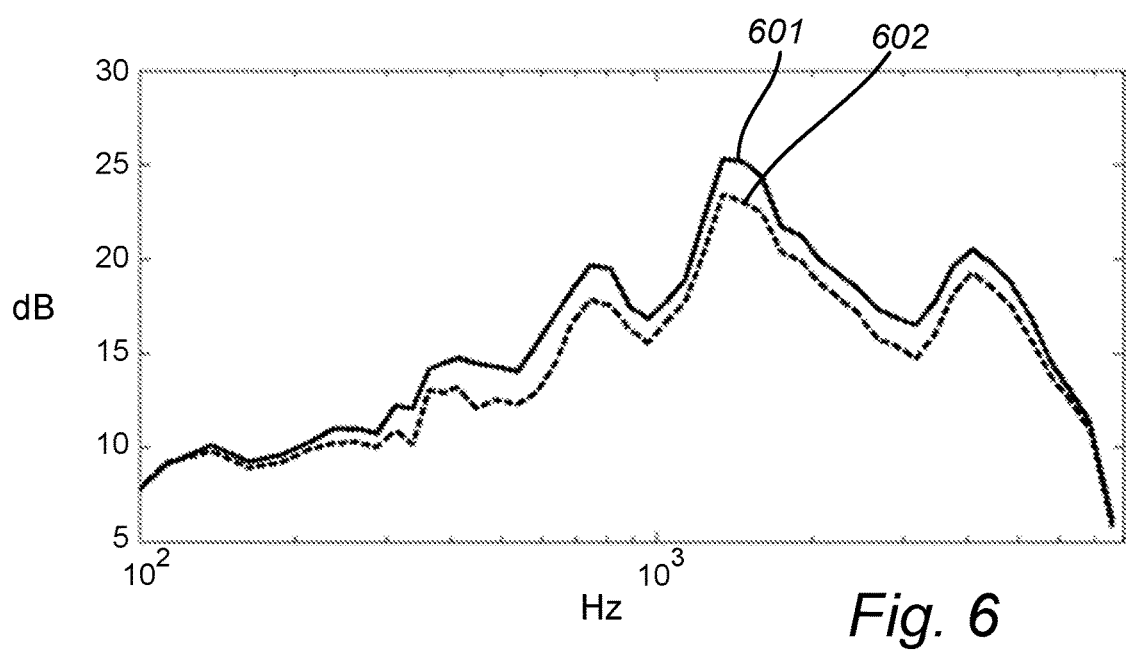
FIG. 6 illustrates example spectra of residuals signals obtained after acoustic echo cancellation with and without compensation for aliasing and/or other types of spectral leakage between frequency subbands.

A specific example application of the audio processing system 300 and the filtering section 400 will now be described with reference to FIGS. 5 and 6. In the present example, the system sampling rate is 16 kHz and a subband acoustic echo cancellation (AEC) setup with 20 ms frame size and 50% overlap window is used. The window function is a conventional sine window. 160 ms long adaptive FIR filters are employed for providing the filtered inband references, which corresponds to eight taps per subband to estimate the in-band echo (in other words, this corresponds to the filters 413, 423, and 433, described with reference to FIG. 4, being eight tap FIR filters). The upper curve 501 in FIG. 5 shows a residual signal computed without use of filtered crossband references. The lower curve 502 in FIG. 5 shows a residual signal computed using filtered crossband references (i.e. employing the filtering section 400 described with reference to FIG. 4). Sample indices are shown along the horizontal axis. In the present example, eight scalar factors are employed to form four filtered crossband references on each side of the current frequency subband (i.e. eight filtered crossband references instead of the two filtered crossband references 424 and 425 described with reference to FIG. 4) in order to estimate the cross-band echo (caused by aliasing and/or other spectral leakage between frequency subbands). FIG. 5 shows that residual echo is reduced, as indicated by the ovals 503 and 504. This effect of crossband filtering is particularly prominent for low-frequency tonal signals where there are strong spikes in the spectrum of the echo signal. Without careful design of the system (e.g., using a window shape that gives good inter-band isolation between the subband signals or using crossband filtering), these strong frequency spikes would leak into neighboring bands, which would smear the spectrum, as illustrated in FIG. 6. The upper curve 601 in FIG. 6 shows the spectrum of the residual signal without cross-band filtering, and the lower curve 602 shows the spectrum of the residual signal with crossband filtering (i.e. employing the filtering section 400 described with reference to FIG. 4). As shown in FIG. 6, the output spectrum of the residual signal (i.e. the echo remaining after echo cancellation) is lower with crossband filtering than without crossband filtering.

As described above, the crossband filtering provided by the filtering section 400, described with reference to FIG. 4, may be employed for acoustic echo cancellation. However, it will be appreciated that the filtering section 400 (and similarly the audio processing method 700 described with reference to FIG. 7) may be employed for modeling or approximating more or less any system providing an audio signal as output in response to a reference audio signal. The adaptive filtering provided by the filtering section 400 allows for adaption of the filters and the scalar factors so as to model or approximate such a system, even if the system has a time-varying impulse response (or transfer function or frequency response).

Depending on the application, it may not be necessary to synthesize an output signal (e.g. the output signal 309 described with reference to FIG. 3) based on the residual signals computed for different frequency subbands. The filters and scalar factors may for example be updated without such an output signal being synthesized, e.g. to model or approximate a transfer function between a reference signal fed to a loudspeaker and a response signal provided by a microphone in response to playback, by the loudspeaker, of the reference signal.

In some examples, the reference signal may be a multi-channel signal. The filtering section 400, described with reference to FIG. 4, may then comprise scalar factors and filters for providing filtered inband references and filtered crossband references for the respective channels. For a given frequency subband, a composite filtered reference may then be formed by summing filtered inband references and filtered crossband references over the channels of the reference signal.

IV. Example Embodiments—Power-Selective Filtering

Conventional acoustic echo cancellation (AEC) schemes rely on several assumptions, such as linearity of the plant (i.e. the transfer function from the speaker to the microphone) and that the plant is only slowly time-varying. However, in many cases, the transfer function from the speaker to the microphone varies more or less all the time. The variation may be so large and/or rapid that it is difficult to provide decent convergence behavior of the adaptive filter within the AEC. The variation of the transfer function is, in fact, in many cases dependent on the speaker playout signal, i.e., the plant changes with respect to the reference signal fed into the AEC. Therefore, the AEC may be improved by employing a plurality of adaptive filters, each corresponding to a particular state of the plant (e.g. a reference power level), instead of using a single adaptive filter for all reference power levels. In this way, different transfer functions (or frequency responses or impulse responses) of the plant for different power levels can be learnt over time and the overall performance of the AEC can be improved.

Figure 9:
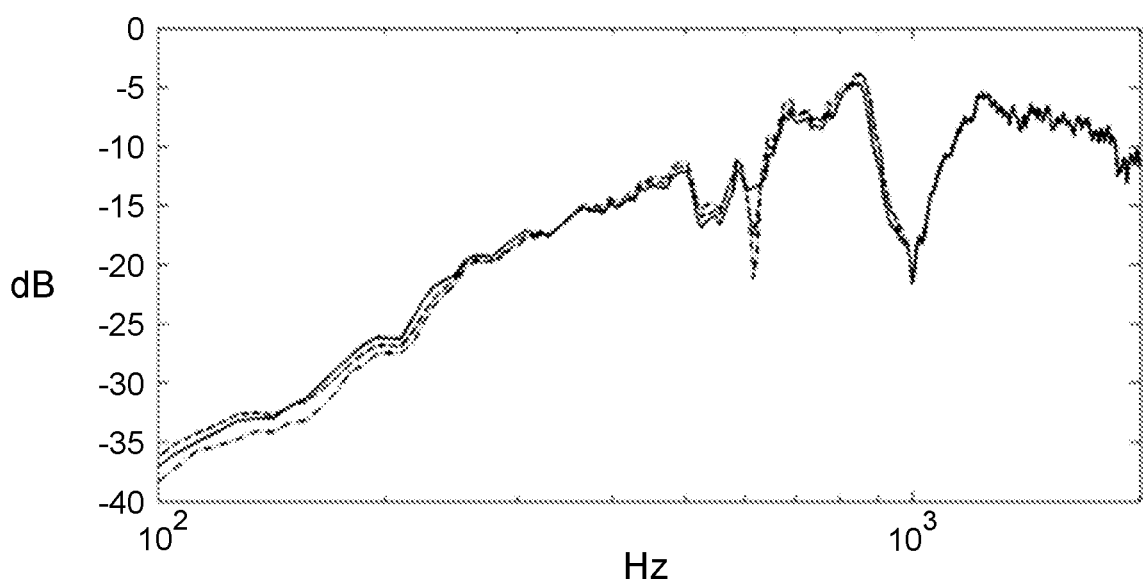
FIG. 9 illustrates transfer functions from a loudspeaker to a microphone for different power levels of a reference signal provided as input to the loudspeaker.

FIG. 9 illustrates transfer functions from a loudspeaker to a microphone for different power levels, by showing the respective frequency responses. It can be seen that, rather than having an identical transfer function (or having an identical frequency response or impulse response), the transfer function varies based on the power level. Furthermore, the variation is different for different frequency subbands. This kind of nonlinear behavior is different from the conventional harmonic distortion and conventional AEC schemes may therefore not work as well as for a static and linear transfer function. The main reason is that in order for a conventional adaptive filter to converge to the true transfer function, the transfer function has to be at least almost static for a certain amount of time so that an iterative algorithm may adapt the filter coefficients towards the true values. However, for speech-like reference signals having rapidly changing power characteristics, the transfer function may change rapidly, and there may not be sufficient time for the filter coefficients to converge to the true values. Furthermore, the adaptive filter is often designed to be robust against doubletalk and background noise, which means that its convergence performance is even poorer than the theoretical limit. The overall outcome is an adaptive filter chasing a transfer function at a speed which is lower than the rate at which the transfer function changes. This may affect the performance of the AEC, which may be manifested as an increase in the estimation error for e.g. speech-like reference signals having rapidly changing power characteristics.

Example embodiments propose addressing this problem by employing multiple adaptive filters, each corresponding to a particular reference power. This strategy tries to 'remember' the different transfer functions (or impulse responses) of the plant for different reference power levels. By giving the adaptive filtering scheme this kind of memory, each adaptive filter may be adjusted towards the true transfer function for its respective power level, and the residual error may be reduced compared to the conventional single-filter scheme. The proposed power-selective adaptive filtering scheme is exemplified by the audio processing systems and methods described with reference to FIGS. 10-14.

Figure 10:
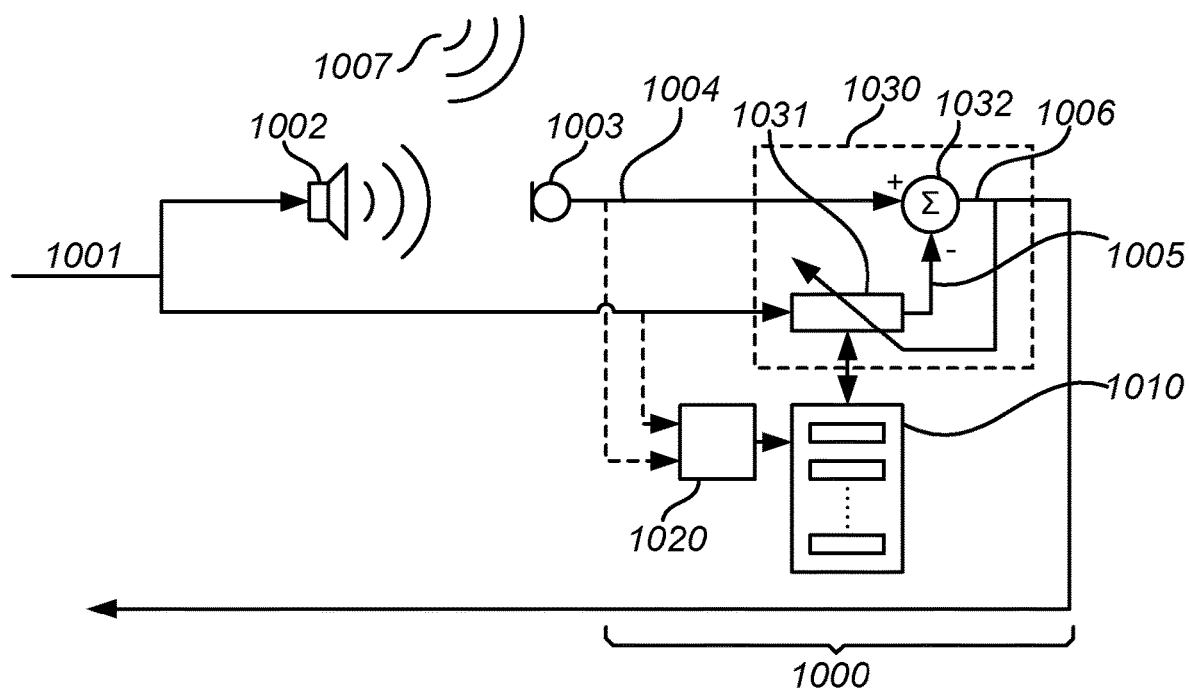

FIG. 10 is a generalized block diagram of an audio processing system 1000, according to an example embodiment. The audio processing system 1000 comprises a storing section 1010, a control section 1020 and a filtering section 1030.

The storing section 1010 stores a plurality of filters. A reference signal 1001 is played back by at least one acoustic signal generator 1002. At least one acoustic transducer 1003 provides a response signal 1004 as output in response to the playback, by the at least one acoustic signal generator 1002, of the reference signal 1001. The audio processing system 1000 receives the response signal 1004. The control section 1020 selects, based on a power level of the reference signal 1001 or of the response signal 1004, a filter 1031 from the plurality of filters stored in the storing section 1010. The filtering section 1030 provides a filtered reference signal 1005 by applying the selected filter 1031 to the reference signal 1001. The filtering section 1030 computes a residual signal 1006 as a difference between the filtered reference signal 1005 and the response signal 1004. The filtering section 1030 then determines an updated version of the selected filter 1031 based on the residual signal 1006. The storing section 1010 then stores the updated version of the selected filter 1031, e.g. by replacing the previous version of the selected filter 1031 by the updated version of the selected filter 1031. Those of the stored filters which are not selected by the control section 1020 may for example not be applied to the reference signal 1001 and may for example not be updated based on the residual signal 1006.

The storing section 1010 may for example include a memory or a look-up table.

The selected filter 1031 may for example be updated to reduce power and/or energy of the residual signal 1006. The selected filter 1031 may for example be adjusted using an optimization algorithm. The selected filter 1031 may for example be adjusted using a least mean squares (LMS) algorithm (e.g. a normalized LMS algorithm).

The residual signal 1006 may for example be computed by subtracting the filtered reference signal 1005 from the response signal 1004, e.g. by component-wise subtraction in a representation (e.g. time domain representation or frequency domain representation) of the filtered reference signal 1005 and the response signal 1004. The filtering section 1030 may for example comprise a difference section 1032 configured to compute the residual signal 1006.

The at least one acoustic signal generator 1002 may for example include one or more loudspeakers or headphones.

The at least one acoustic transducer 1003 may for example include one or more microphones.

The filters stored in the storing section 1010 may for example be multitap filters, e.g. finite impulse response (FIR) filters including multiple coefficients. The number of taps of the filters may for example correspond to the length or duration of an impulse response from the acoustic signal generator 1002 to the acoustic transducer 1003. The number of taps of the filters may for example correspond to at least the time it takes for an audio signal to travel from the acoustic signal generator 1002 to the acoustic transducer 1003, e.g. including the time it takes for the audio signal to be reflected off walls before reaching the acoustic transducer 1003.

In the example embodiment described with reference to FIG. 10, the audio processing system 1000 receives the reference signal 1001. The control section 1020 may for example receive the reference signal 1001. The control section 1020 may then estimate a power level of the reference signal 1001 and select the filter 1031 based on the estimated power level. Alternatively, the control section 1020 may receive the response signal 1004. The control section 1020 may then estimate a power level of the response signal 1004 and select the filter 1031 based on the estimated power level.

Both the power level of the reference signal 1001 and the power level of the response signal 1104 may be indicative of a state in which the acoustic signal generator 1002 and the acoustic transducer 1003 are operating, and may therefore be useful for selecting an appropriate filter 1031.

The selection of a filter 1031 may for example be made for each time frame, or for a portion of a time frame, i.e. a new filter may be selected for a succeeding time frame or for a succeeding portion of a time frame. The selection of a filter 1031 may for example be made for each single sample of the reference signal 1001 and/or of the response signal 1004.

The number of filters stored in the storing section 1010 depends on how accurate the characterization or modeling of the transfer function (from the acoustic signal generator 1002 to the acoustic transducer 1003) needs to be. The purpose of storing a certain number of filters is to divide the range of the reference power into that number of regions, where each region is assigned one filter to characterize the corresponding transfer function. It should be noted that the overall computational complexity of the audio processing system 1000 is similar to computational complexity of the conventional acoustic echo cancellation scheme. Indeed, although a plurality of filters need to be stored, only one of the filters needs to be activated and updated for each time frame or sample.

The reference signal 1004 may for example comprise audio content originating from other sound sources 1007 than the acoustic signal generator 1002, such as other loudspeakers or a human speaker in a vicinity of the acoustic transducer 1003. The response signal 1004 may comprise noise, e.g. in the form of ambient noise from a room in which the acoustic transducer 1003 is arranged.

The audio processing system 1000, described with reference to FIG. 10, may for example be employed for acoustic echo cancellation (AEC). Audio content from a remote user may be played back by a loudspeaker 1002 to be heard by a local user. The local user may speak 1007 into a microphone 1003. Audio content from the remote user may also be picked up by the microphone 1003 but may be cancelled by the audio processing system 1000. The residual signal 1006, from which echo has been cancelled may then be transmitted to the remote user, e.g. after additional audio processing (e.g. for suppressing noise).

The audio processing system 1000 may for example perform AEC in real time during a phone call or during a teleconference. The filter 1031 may then be updated based on the residual signal 1006 when the local user 1007 is silent, and the updated selected filter 1031 may then be used for cancelling echo also when the local user 1007 speaks.

The audio processing system 1000 may for example perform AEC on a recorded response signal provided by an acoustic transducer (e.g. microphone) in response to a reference signal. In such an application, look-ahead may for example be employed to determine suitable values for the filters. Alternatively or additionally, once suitable parameter values for the filters have been determined, it may be possible to move back and employ such values to perform AEC on earlier time frames of the recorded response signal. Suitable initial values for the filters may for example be determined prior to a phone call, e.g. based on recorded reference signals and associated recorded response signals, and the filters may then be adjusted further during the phone call to track changing conditions.

In some example embodiments, the audio processing system 1000 may perform adaptive filtering for respective frequency subbands, similarly to the audio processing system 300, described with reference to FIG. 3. More specifically, the audio processing system 1000 may comprise analysis sections (not shown in FIG. 10) configured to decompose the fullband reference signal 1001 and the fullband response signal 1004 into subband signals corresponding to respective frequency subbands. The analysis sections may be of the same type as the analysis sections 310 and 320, described with reference to FIG. 3.

The control section 1020 may for example select filters for the respective frequency subbands based on power levels of the respective subband signals of the reference signal 1001. The respective selected filters may be applied to the respective subband signals of the reference signal 1001, respective residual signals may be computed and the respective selected filters may be updated based on the respective residual signals.

The audio processing system 1000 may for example perform adaptive filtering for the respective frequency subbands without the crossband filtering described with reference to FIG. 4, i.e. without use of filtered crossband references 424 and 425. Alternatively, the audio processing system 1000 may employ also the crossband filtering described with reference to FIG. 4, where both the filters and the scalar factors (e.g. the scalar factors 426 and 427 described with reference to FIG. 4) are selected from a storage or memory based on a power level of a subband signal of the reference signal 1001.

The audio processing system 1000 may for example comprise resampling sections (not shown in FIG. 10) configured to downsample the subband signals of the reference signal 1001 and the response signal 1004. The resampling sections may for example be of the same type as the resampling sections 330 and 340 described with reference to FIG. 3.

Figure 15:
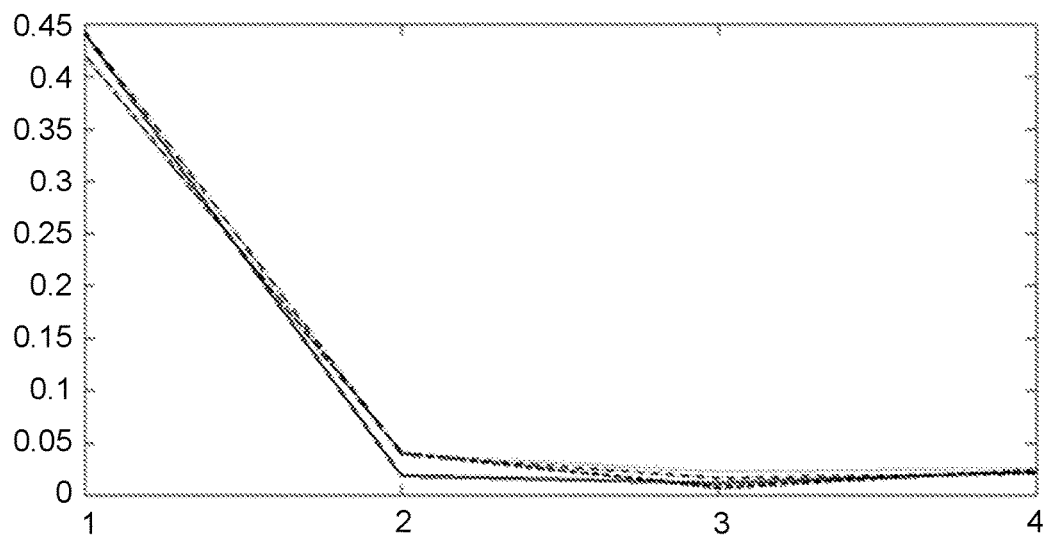
FIG. 15 shows magnitudes of filter coefficients for respective filters of an audio processing system, according to an example embodiment.

A specific example application will now be described with reference to FIGS. 15 and 16. In the present example, the system sampling rate is 16 kHz. Subband filtering is employed for performing acoustic echo cancellation. A frame size of 20 ms and 50% overlap window is employed. The reference power is divided into the four regions −80 to 65 dB, −65 to −50 dB, −50 to −35 dB and −35 to −20 dB. Each of the power regions is assigned one adaptive multitap FIR filter. The adaptive filtering performed by the audio processing system 1000, described with reference to FIG. 10, is performed independently for each frequency subband. FIG. 15 illustrates the magnitudes of the obtained filter coefficients of the different filters for a frequency subband around 1000 Hz. Coefficient indices are shown along the horizontal axis. It can be seen that the filter coefficients are different for the different power regions. By storing these different filters for the respective power regions, a more accurate approximation or model of the loudspeaker 1002 and microphone 1003 can be expected and therefore also a more efficient acoustic echo cancellation.

Figure 16:
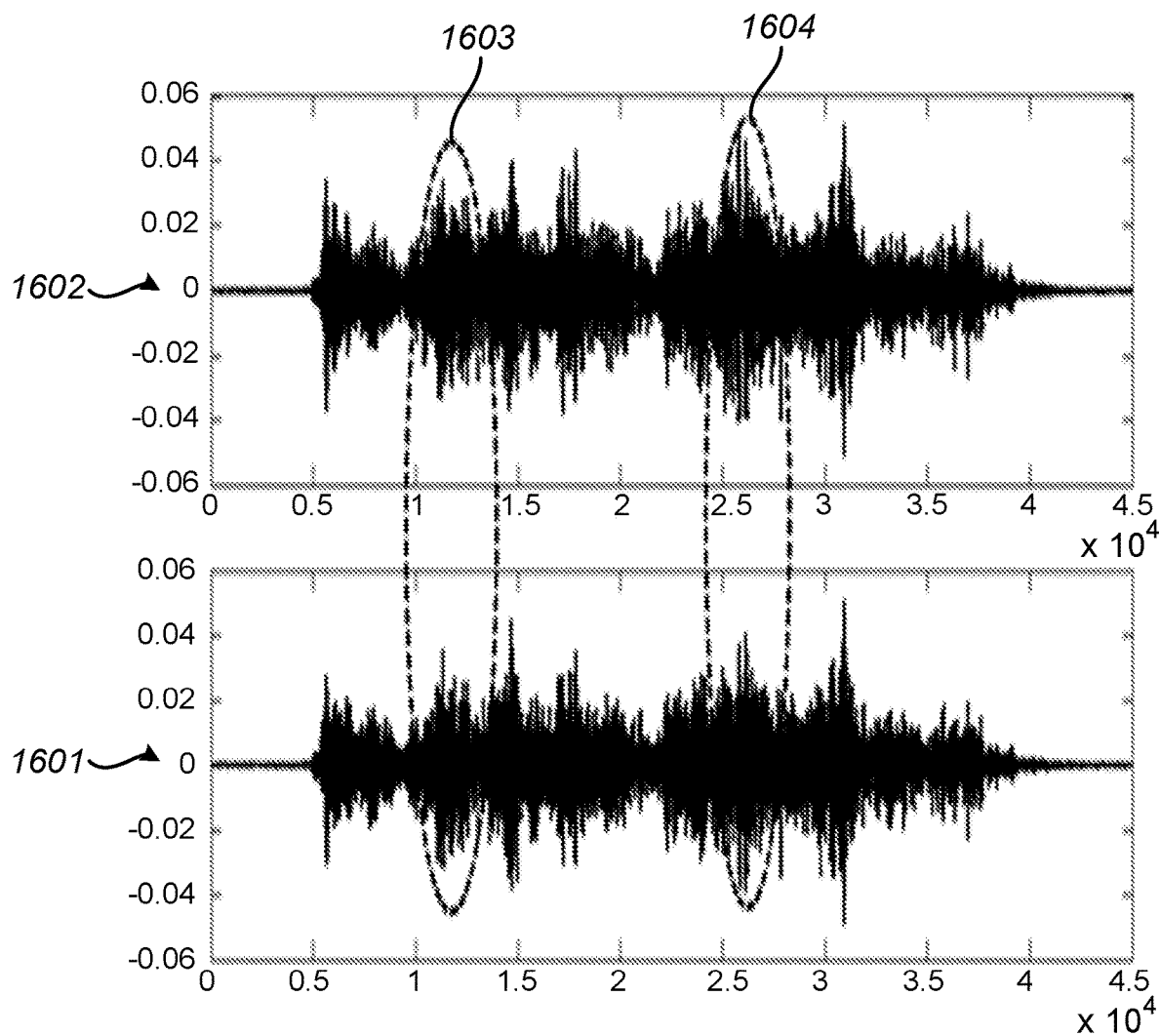
FIG. 16 shows residual signals obtained with conventional acoustic echo cancellation and with acoustic echo cancellation according to an example embodiment.

The residual signal provided as output when performing AEC with the audio processing system 1000 of the present example (i.e. power-selective adaptive filtering where a fullband residual signal is synthesized based on the computed residual signals for the respective frequency subbands) is shown as the lowermost curve 1601 in FIG. 16. A residual signal provided as output by a conventional AEC system (i.e. using the same adaptive filter for all power levels) for the same audio input is shown as the uppermost curve 1602 in FIG. 16. Sample indices are shown along the horizontal axis. FIG. 16 shows that the power-selective adaptive filtering reduces the residual echo, particularly for time periods where there are dramatic voice onsets or voice offsets, as indicated by the ovals 1603 and 1604.

The audio processing system 1000 may be employed for modeling loudspeakers or other acoustic signal generating devices, e.g. for performing acoustic echo cancellation. However, modeling of acoustic signal generating devices may be employed for other purposes. For example, the audio processing system 1000 may be employed for determining equalization filters for loudspeakers, similarly to the audio processing system 1100, described below with reference to FIG. 11.

Figure 11:
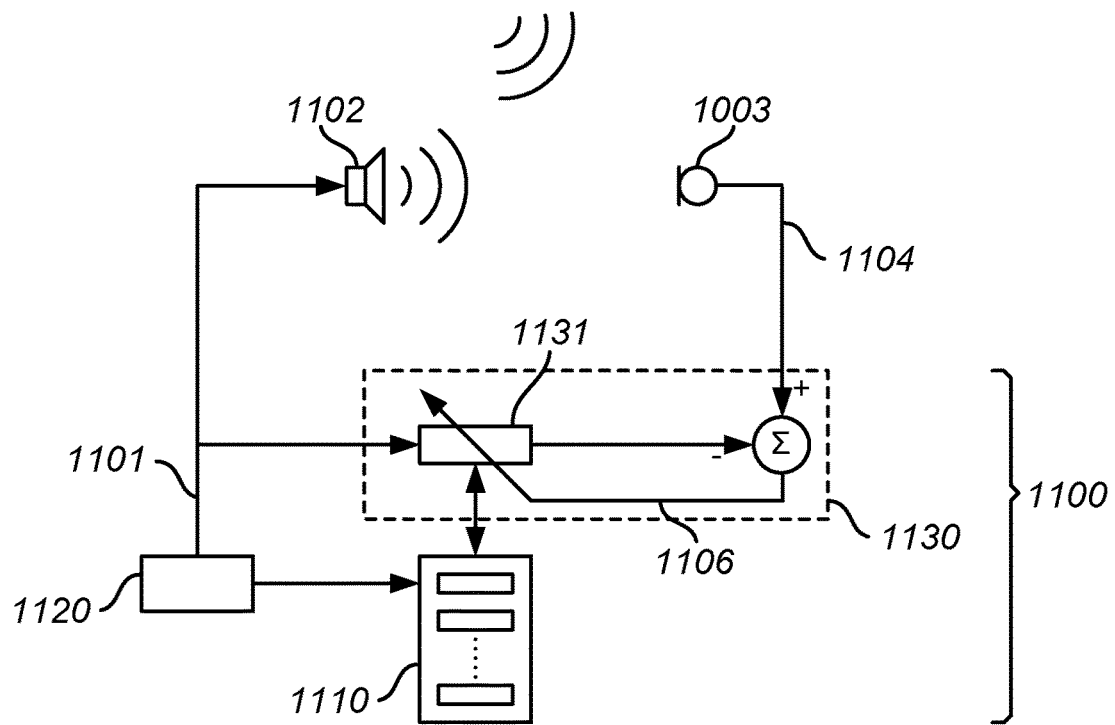

FIG. 11 is a generalized block diagram of an audio processing system 1100, according to an example embodiment. Similarly to the audio processing system 1000, described with reference the FIG. 10, the audio processing system 1100 comprises a storing section 1110, a control section 1120 and a filtering section 1130. However, instead of receiving a reference signal, the audio processing system 1100 provides reference signals itself. The control section 1120 provides a plurality of reference signals 1101 having respective different power levels to at least one acoustic signal generator 1102. At least one acoustic transducer 1103 provides response signals 1104 as output in response to the playback of the reference signals 1001. The audio processing system 1100 receives the response signals 1104.

The reference signals 1104 may for example be generated or synthesized by the controls section 1120, e.g. from white noise or via pulse width modulation. The reference signals 1104 may for example be retrieved from storage of audio samples stored for respective power levels.

For each reference signal 1101, the control section 1120 selects a filter 1131 from a plurality of filters stored in the storage section 1110 based on the power level of the reference signal 1104. In the present example embodiment, the power level of the reference signal 1101 may be known a priori by the control section 1120 and there may be no need for the control section 1120 to estimate the power level.

Similarly to the filtering section 1030, described with reference to FIG. 10, the filtering section 1130 applies the selected filter 1131 to the reference signal 1101, computes a residual signal 1106, and determines an updated version of the selected filter 1131 based on the residual signal 1106.

The audio processing system 1100 may for example be employed for calculating equalization filters for use during playback by the at least one acoustic signal generator 1102 (e.g. headphones or a loudspeaker). An equalization filter may be employed to adjust a balance between frequency components in an audio signal prior to the audio signal being played back by the acoustic signal generator 1102. A model of the acoustic signal generator 1102, as provided by adaptive filtering of the audio processing system 1100, allows for calculating an equalization filter to obtain a desired balance between frequency components in the acoustic output actually provided by the acoustic signal generator 1102.

In the present example embodiment, the reference signals are provided at different power levels for updating (based on the residual signals) the filters modeling the acoustic signal generator 1102 at these power levels. Once the filters have been appropriately updated (e.g. so as to reduce power and/or energy of the respective residual signals), the filters may be used for calculating equalization filters.

If for example an audio signal is to be played back by the acoustic signal generator 1102, a power level of the audio signal is estimated. A filter is selected from the plurality of stored filters based on the estimated power level. The filter selected for the audio signal is indicative of an acoustic output which would be provided by the acoustic signal generator 1102 if the audio signal was to be played back. An equalization filter, for use during playback of the audio signal by the acoustic signal generator 1102, may therefore be calculated based on the selected filter, so as to obtain a desired balance between frequency components in the acoustic output provided by the acoustic signal generator 1102 when playing back the audio signal.

The audio processing system 1100 may also be used for leveling the acoustic signal generator 1102 relative to other acoustic signal generators. Indeed, a model of the acoustic signal generator 1102, as provided by the adaptive filtering of the audio processing system 1100, allows for predicting an output power of the acoustic signal generator 1102 for a given reference signal fed to the acoustic signal generator 1102. Leveling of the acoustic signal generator 1102 relative to other acoustic signal generators may be provided based on the predicted output power, e.g. by applying an appropriate gain or attenuation to the given reference signal before it is be played back by the acoustic signal generator.

In the present example embodiment, the residual signal 1106 is only used for updating the filters and there may be no need to provide the residual signal 1106 as output from the audio processing system 1100. However, it will be appreciated that if the audio processing system 1100, described with reference to FIG. 11, is employed for e.g. acoustic echo cancellation, then the residual signal 1106 may for example be provided to a remote user (e.g. after additional processing) as an audio signal from which echo has been cancelled.

FIG. 12 is a generalized block diagram of an audio processing system 1200, according to an example embodiment. Similarly to the audio processing system 1000, described with reference the FIG. 10, the audio processing system 1210 comprises a storing section 1210, a control section 1220 and a filtering section 1230. The storing section 1210, the control section 1220, and the filtering section 1230 operates in the same way as the corresponding sections in the audio processing system 1000, described with reference to FIG. 10.

However, the audio processing system 1200 further comprises an additional filtering section 1240 and an output section 1250. The additional filtering section 1240 is arranged in parallel to the filtering section 1230 and is configured to operate independently of the power levels of the reference signal 1201 and the associated response signal 1204 received by the audio processing system 1200. The additional filtering section 1240 provides an alternatively filtered reference signal 1207 by applying an alternative filter 1241 to the reference signal 1201. The additional filtering section 1240 computes an alternative residual signal 1208 as a difference between the alternatively filtered reference signal 1207 and the response signal 1204, and updates the alternative filter 1241 based on the alternative residual signal 1208.

The output section 1250 receives the residual signal 1206 and the alterative residual signal 1208 and selects one of them as output 1209. The selection is made based on power levels or energy levels of the residual signal 1206 and the alternative residual signal 1208. The signal with lowest power or energy may for example be selected by the output section 1250 as output of the audio processing system 1200.

Some of the filters stored in the storing section 1210 may not be selected very often and may therefore not have been updated for quite some time when finally selected based on the power level of the reference signal and/or the response signal. In such situations, a conventional adaptive filter 1241 which is updated regardless of the power level may for example temporarily provide a more accurate approximation than the filter selected based on the power level (i.e. the alternative residual signal 1208 may have lower power and/or energy than the residual signal 1206). The conventional filter 1241 may for example converge to a local optimum which may provide acceptable performance until the power-specific filters have converged and may provide even better performance.

The alternative filtering section 1240 may for example comprise a difference section 1242 configured to compute the alternative residual signal 1208, e.g. by performing element-wise subtraction in a frequency-domain representation of the alternative filtered reference signal 1207 and the response signal 1204.

The alternative selected filter 1241 may for example be updated to reduce power and/or energy of the alternative residual signal 1208. The alternative selected filter 1241 may for example be adjusted using an optimization algorithm. The alternative selected filter 1241 may for example be adjusted using a least mean squares (LMS) algorithm (e.g. a normalized LMS algorithm).

If the audio processing system 1200 is employed for acoustic echo cancellation, the output 1209 may be provided to a remote user (e.g. after additional processing).

FIG. 13 is a flow chart of audio processing method 1300, according to an example embodiment. The method 1300 may for example be performed by the audio processing system 1000, described with reference to FIG. 10.

The method 1300 comprises: receiving 1301 a reference signal; and receiving 1302 a response signal in the form of an audio signal provided by at least one acoustic transducer in response to playback, by at least one acoustic signal generator, of a reference signal. The method 1300 comprises: estimating 1303 a power level of at least one of the reference signal and the response signal; selecting 1304, based on the estimated power level, a filter from plurality of stored filters; and applying 1305 the selected filter to the reference signal. The method 1300 comprises: computing 1306 a residual signal as a difference between the filtered reference signal and the response signal; and updating 1307 the selected filter based on the residual signal.

The residual signal (e.g. the residual signal 1006, computed by the filtering section 1030 described with reference to FIG. 10) may be computed for a time frame, or for a portion of a time frame. Once the selected filter has been updated, the method 1300 returns to the step of receiving 1301 a new time frame (or a portion of a time frame) of the reference signal and receiving 1302 a new time frame (or a portion of a time frame) of the residual signal. A new filter is then selected for a succeeding time frame, or for a succeeding portion of a time frame, from the plurality of stored filters in which the previously selected filter has been updated.

The selected filter may for example be updated to reduce power and/or energy of the residual signal. The selected filter may for example be updated using an optimization algorithm. The selected filter may for example be updated using a least mean squares (LMS) algorithm (e.g. a normalized LMS algorithm).

The method 1300 may for example comprise determining 1308 whether a power level or an energy level of the residual signal exceeds a threshold. If the threshold is exceeded, this may be an indication that the response signal includes audio content originating from other sources than the reference signal (e.g. the additional sound source 1007, described with reference to FIG. 10). It may therefore be inappropriate to update the selected filter (e.g. the selected filter 1031, described with reference to FIG. 10) based on the residual signal. Hence, if the threshold is exceeded, which is indicated by an outgoing branch labeled Y from the decision box 1380, updating of the selected filter may be dispensed with for one or more time frames, and the method 1300 returns to receiving 1301 a new time frame (or a portion of a time frame) of the reference signal and receiving 1302 a new time frame (or a portion of a time frame) of the residual signal.

The threshold may for example be predefined. The threshold may for example be updated or adjusted based on the performance of the adaptive filtering.

Updating of the alternative selected filter 1241, described with reference to FIG. 12, may for example also be dispensed with if a power or energy level of the residual signal (and/or the alternative residual signal 1208, described with reference to FIG. 12) exceeds a threshold.

If the threshold is not exceeded, which is indicated by an outgoing branch labeled N from the decision box 1308, the selected filter may be updated before returning to receiving 1301 a new time frame (or a portion of a time frame) of the reference signal and receiving 1302 a new time frame (or a portion of a time frame) of the residual signal.

FIG. 14 is a flow chart of audio processing method 1400, according to example embodiments. The method 1400 may for example be performed by the audio processing system 1100, described with reference to FIG. 11.

The method 1400 comprises: providing 1401, for each of a plurality of power levels, a reference signal having the power level. The method 1400 comprises receiving 1402 response signals in the form of an audio signals provided by at least one acoustic transducer in response to playback, by at least one acoustic signal generator, of the respective references signals. The method 1400 comprises: selecting 1403, based on the respective power level, a filter from a plurality of stored filters; applying 1404 the selected filter to the reference signal having the power level; computing 1405 a residual signal as a difference between the filtered reference signal and the response signal for the power level; and updating 1406 the selected filter based on the residual signal for the power level.

V. EQUIVALENTS, EXTENSIONS, ALTERNATIVES AND MISCELLANEOUS

Even though the present disclosure describes and depicts specific example embodiments, the invention is not restricted to these specific examples. Modifications and variations to the above example embodiments can be made without departing from the scope of the invention, which is defined by the accompanying claims only.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs appearing in the claims are not to be understood as limiting their scope.

The devices and methods disclosed above may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out in a distributed fashion, by several physical components in cooperation. Certain components or all components may be implemented as software executed by a digital processor, signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. An audio processing method comprising:
   receiving a response signal in the form of an audio signal provided by at least one acoustic transducer in response to playback, by at least one acoustic signal generator, of a reference signal;
   selecting, based on a power level of at least one of the reference signal and the response signal, a filter from a plurality of stored filters;
   applying the selected filter to the reference signal;
   computing a residual signal as a difference between the filtered reference signal and the response signal; and
   updating the selected filter based on the residual signal.

2. The method of claim 1, wherein the selected filter is updated to reduce power and/or energy of the residual signal.

3. The method of claim 1, comprising:
   receiving the reference signal; and
   estimating a power level of at least one of the reference signal and the response signal.

4. The method of claim 3, wherein the selection of a filter is made for a time frame, or for a portion of a time frame, and wherein a new selection is made for a succeeding time frame, or for a succeeding portion of a time frame, from the plurality of stored filters in which said selected filter has been updated.

5. The method of claim 1, comprising, for each of a plurality of power levels:
   providing a reference signal having the power level;

receiving a response signal in the form of an audio signal provided by the at least one acoustic transducer in response to playback, by the at least one acoustic signal generator, of the reference signal having the power level;

selecting, based on the power level, a filter from a plurality of stored filters;

applying the selected filter to the reference signal having the power level;

computing a residual signal as a difference between the filtered reference signal and the response signal for the power level; and updating the selected filter based on the residual signal for the power level.

6. The method of claim 1, comprising:
cancelling, based on at least one of the filters, audio content originating from the at least one acoustic signal generator in an audio signal provided by the at least one acoustic transducer.

7. The method of claim 1, comprising:
receiving an audio signal;
estimating a power level of said audio signal;
selecting, based on the power level of said audio signal, a filter from the plurality of stored filters; and
calculating, based on the filter selected for said audio signal, an equalization filter for use during playback, by the at least one acoustic signal generator, of said audio signal.

8. The method of claim 1, comprising:
in response to a power level or energy level of the residual signal exceeding a threshold, dispensing with updating of the selected filter for at least one time frame.

9. The method of any of claim 1, comprising:
providing an alternatively filtered reference signal by applying, regardless of the power level on which the selection of the filter is based, an alternative filter (1241) to the reference signal;
computing an alternative residual signal (1208) as a difference between the alternatively filtered reference signal and the response signal;
updating the alternative filter based on the alternative residual signal; and
selecting between the residual signal and the alternative residual signal based on power levels or energy levels of the residual signal and the alternative residual signal.

10. The method of claim 1, comprising:
decomposing the reference signal and the response signal into subband signals corresponding to respective frequency subbands; and
for each of the frequency subbands:
selecting, based on a power level of at least one of the subband signal of the reference signal corresponding to the frequency subband and the subband signal of the response signal corresponding to the frequency subband, a filter from a plurality of stored filters for the frequency subband;
applying the selected filter for the frequency subband to the subband signal of the reference signal corresponding to the frequency subband;
computing a residual signal as a difference between the filtered subband signal and the subband signal of the response signal corresponding the frequency subband; and
updating the selected filter for the frequency subband based on the residual signal for the frequency subband.

11. A non-transitory computer-readable medium storing instructions that, when executed by one or more computer processors, cause the one or more computer processors to perform operations comprising:
receiving a response signal in the form of an audio signal provided by at least one acoustic transducer in response to playback, by at least one acoustic signal generator, of a reference signal;
selecting, based on a power level of at least one of the reference signal and the response signal, a filter from a plurality of stored filters;
applying the selected filter to the reference signal;
computing a residual signal as a difference between the filtered reference signal and the response signal; and
updating the selected filter based on the residual signal.

12. The non-transitory computer-readable medium of claim 11, wherein the selected filter is updated to reduce power and/or energy of the residual signal.

13. The non-transitory computer-readable medium of claim 11, the operations comprising:
receiving the reference signal; and
estimating a power level of at least one of the reference signal and the response signal.

14. The non-transitory computer-readable medium of claim 13, wherein the selection of a filter is made for a time frame, or for a portion of a time frame, and wherein a new selection is made for a succeeding time frame, or for a succeeding portion of a time frame, from the plurality of stored filters in which said selected filter has been updated.

15. An audio processing system comprising:
one or more computer processors; and
a non-transitory computer-readable medium storing instructions that, when executed by the one or more computer processors, cause the one or more computer processors to perform operations comprising:
receiving a response signal in the form of an audio signal provided by at least one acoustic transducer in response to playback, by at least one acoustic signal generator, of a reference signal;
selecting, based on a power level of at least one of the reference signal and the response signal, a filter from a plurality of stored filters;
applying the selected filter to the reference signal;
computing a residual signal as a difference between the filtered reference signal and the response signal; and
updating the selected filter based on the residual signal.

16. The audio processing system of claim 15, wherein the selected filter is updated to reduce power and/or energy of the residual signal.

17. The audio processing system of claim 15, the operations comprising:
receiving the reference signal; and
estimating a power level of at least one of the reference signal and the response signal.

18. The audio processing system of claim 17, wherein the selection of a filter is made for a time frame, or for a portion of a time frame, and wherein a new selection is made for a succeeding time frame, or for a succeeding portion of a time frame, from the plurality of stored filters in which said selected filter has been updated.

19. The audio processing system of claim 15, the operations comprising, for each of a plurality of power levels:
providing a reference signal having the power level;
receiving a response signal in the form of an audio signal provided by the at least one acoustic transducer in response to playback, by the at least one acoustic signal generator, of the reference signal having the power level;

selecting, based on the power level, a filter from a plurality of stored filters;

applying the selected filter to the reference signal having the power level;

computing a residual signal as a difference between the filtered reference signal and the response signal for the power level; and updating the selected filter based on the residual signal for the power level.

20. The audio processing system of claim 15, the operations comprising:

cancelling, based on at least one of the filters, audio content originating from the at least one acoustic signal generator in an audio signal provided by the at least one acoustic transducer.

* * * * *

UNITED STATES PATENT AND TRADEMARK OFFICE
CERTIFICATE OF CORRECTION

| | | |
|---|---|---|
| PATENT NO. | : 11,264,045 B2 | Page 1 of 1 |
| APPLICATION NO. | : 16/564532 | |
| DATED | : March 1, 2022 | |
| INVENTOR(S) | : Dong Shi et al. | |

It is certified that error appears in the above-identified patent and that said Letters Patent is hereby corrected as shown below:

On the Title Page

Column 1, Item (30) Foreign Application Priority Data, Line 1, Delete "(WO)" and insert --(CN)--.

In the Claims

Column 33, Claim 9, Line 33, after "method", delete "of any".
Column 33, Claim 10, Line 62, after "corresponding", insert --to--.

Signed and Sealed this
Seventh Day of January, 2025

Derrick Brent
*Acting Director of the United States Patent and Trademark Office*